(12) United States Patent
Fyfe et al.

(10) Patent No.: US 11,604,105 B2
(45) Date of Patent: Mar. 14, 2023

(54) ADHESIVE STRAIN SENSING PODS WITH IMPROVED PROTECTION

(71) Applicant: 4iiii Innovations Inc., Cochrane (CA)

(72) Inventors: Kipling William Fyfe, Cochrane (CA); James Hildebrandt, Calgary (CA); Ken Fyfe, Cochrane (CA); Anna Miasnikova, Cochrane (CA)

(73) Assignee: 4IIII INNOVATIONS INC., Cochrane (CA)

( * ) Notice: Subject to any disclaimer, the term of this patent is extended or adjusted under 35 U.S.C. 154(b) by 652 days.

(21) Appl. No.: 16/701,508

(22) Filed: Dec. 3, 2019

(65) Prior Publication Data

US 2020/0182715 A1  Jun. 11, 2020

Related U.S. Application Data

(60) Provisional application No. 62/775,765, filed on Dec. 5, 2018.

(51) Int. Cl.
| | |
|---|---|
| *G01L 1/22* | (2006.01) |
| *G01L 1/16* | (2006.01) |
| *G01L 1/24* | (2006.01) |
| *H05B 3/46* | (2006.01) |

(Continued)

(52) U.S. Cl.
CPC .............. *G01L 1/2206* (2013.01); *C09J 7/35* (2018.01); *G01L 1/16* (2013.01); *G01L 1/2293* (2013.01); *G01L 1/242* (2013.01); *G01L 1/26* (2013.01); *H05B 3/46* (2013.01); *C09J 2203/326* (2013.01); *C09J 2301/414* (2020.08); *C09J 2409/00* (2013.01); *C09J 2423/04* (2013.01); *C09J 2423/10* (2013.01); *C09J 2431/00* (2013.01); *C09J 2433/00* (2013.01); *C09J 2461/00* (2013.01); *C09J 2463/00* (2013.01); *C09J 2467/00* (2013.01);

(Continued)

(58) Field of Classification Search
None
See application file for complete search history.

(56) References Cited

U.S. PATENT DOCUMENTS

| | | | | |
|---|---|---|---|---|
| 6,441,503 B1 * | 8/2002 | Webster | ................ | G01L 19/147 |
| | | | | 257/E21.504 |
| 6,693,624 B1 * | 2/2004 | Niiyama | ................ | G05G 9/047 |
| | | | | 345/157 |

(Continued)

*Primary Examiner* — Lisa M Caputo
*Assistant Examiner* — Nigel H Plumb
(74) *Attorney, Agent, or Firm* — Lathrop GPM LLP

(57) ABSTRACT

An adhesive strain sensing pod includes at least one strain sensor, electronics for electrically sensing at least one strain signal from the at least one strain sensor, and a sensor adhesive for adhering the strain sensor to a surface of a structural element. The pod may have a protective case for protecting the strain sensor and the electronics and for transferring at least part of a force, pressing the pod against the surface, to press the strain sensor against the surface. The sensor adhesive may be a liquid adhesive contained in a fragile pouch that ruptures when the pod is forced against the surface, or may be a thermally activated adhesive film that is activated to bond the strain sensor to the surface. A protective film may protect the sensor adhesive prior to installation of the pod and is removed prior to installation of the pod on the surface.

35 Claims, 17 Drawing Sheets

(51) Int. Cl.
*C09J 7/35* (2018.01)
*G01L 1/26* (2006.01)
(52) U.S. Cl.
CPC ........ *C09J 2469/00* (2013.01); *C09J 2475/00* (2013.01); *C09J 2477/00* (2013.01); *C09J 2483/00* (2013.01)

(56) References Cited

U.S. PATENT DOCUMENTS

| | | | |
|---|---|---|---|
| 7,806,675 B2* | 10/2010 | Maruyama | B29C 45/77 425/149 |
| 9,389,134 B2* | 7/2016 | Iimori | G01L 19/0069 |
| 2008/0236300 A1* | 10/2008 | Mueck | G01B 7/20 73/862.627 |
| 2010/0313667 A1* | 12/2010 | Terada | H01L 21/67132 257/E21.531 |
| 2015/0330846 A1* | 11/2015 | Norpoth | G01L 1/2218 156/293 |

* cited by examiner

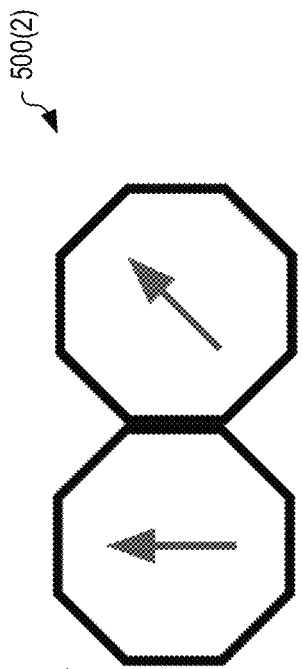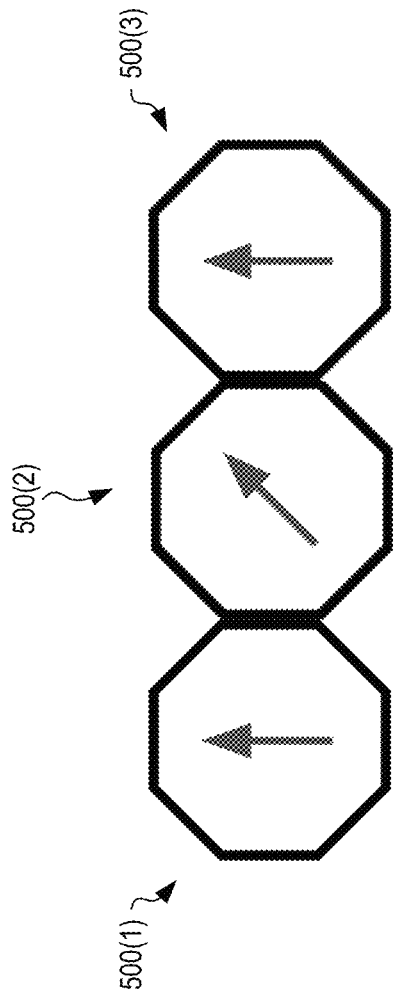

ADHESIVE STRAIN SENSING PODS WITH IMPROVED PROTECTION

RELATED APPLICATION

This application claims priority to U.S. Patent Application Ser. No. 62/775,765, titled "Wireless Adhesive Strain-Gauge Pods," filed Dec. 5, 2018, and which is incorporated herein in its entirety by reference.

BACKGROUND

Installing a strain-gauge is a time-consuming process with several steps that require specialized equipment and training. Typically, a surface of a structural element to which the strain-gauge is to be attached must be prepared by sanding, cleaning, and/or chemically neutralizing to ensure that the strain-gauge properly adheres to the surface. The strain-gauge is affixed to the prepared surface with a liquid glue, and the strain-gauge may be clamped to the surface while the liquid glue hardens. The glued strain-gauge may also be heat-cured to relieve stresses that could cause erroneous readings from the strain-gauge. Wires are then soldered or bonded to make electrical contact with the strain-gauge, and the other end of the wires are connected to appropriate electronics for exciting and/or reading the strain-gauge. The electronics may also be connected to data-processing equipment, such as data loggers, storage devices, and displays.

SUMMARY OF THE EMBODIMENTS

The proposed embodiments describe features and installation of an adhesive strain sensing pod that benefits from simple, fast and safe installation, where an installer does not have to be technically skilled, and where the installer does not have to directly manipulate liquid glues and delicate strain sensors (e.g., strain-gauges). Advantageously, the electronics, CPU with associated signal processing and data transfer, are all pre-connected and tested at the time of manufacture, and may be contained within a housing to protect them from the environment.

Embodiments presented herein advantageously simplify the mounting, installation, and preparation of strain sensors by utilizing a pod that combines at least one strain sensor with front-end electronics, analog-to-digital converter (ADC), wired or wireless transceiver, and energy store (e.g., battery). By co-mounting the strain sensor and front-end electronics within the pod, electrical connections between these components may be made with short circuit-board traces, as opposed to more long, complex wired solutions (e.g., shielded, twisted-pairs) used to prevent pick-up and interference when the sensor and front-end electronics are not physically proximate. The inherent immunity to noise and pick-up due to the proximity of the strain sensor and the electronics also simplifies the front-end electronic design. In addition, the physical proximity of the components to each other reduce sensitivity to temperature changes.

The use of a wireless transceiver to transmit the strain sensor measurements, along with a co-housed energy store (e.g., a battery) to power the wireless transceiver and other electronics, advantageously removes the need for any wires, either internal or external, whatsoever. This benefit is particularly applicable to monitoring of a structural element in which limited physical access makes in situ soldering of wires to the strain sensor particularly difficult and more likely to damage the strain sensor.

Embodiments herein also benefit from adhesive dispensing and curing devices that simplify affixing of a strain sensor to a surface of a structural element, advantageously removing many of the surface-preparation steps typically required for strain sensor mounting. As described in more detail below, the rest of the housing may then be simply affixed to the surface (around the strain sensor itself) using adhesive (e.g., a double-sided tape or more conventional adhesives).

In the embodiments presented herein, the strain sensor may represent any one or more of a strain-gauge (foil, ceramic, semiconductor), a laser based strain sensor, piezoelectric, photoelectric, vibrating wire, and a fiber optic; however, other types of strain sensing sensors may be used without departing from the scope hereof. Further, an adhesive pod as described herein may be alternatively or additionally configured to operate with an accelerometer, gyroscope, magnetometer, temperature sensor (e.g., platinum resistor, thermocouple, thermistor), pressure sensor, humidity sensor, light sensor (e.g., photodiode), proximity sensor, or an acoustic sensor (e.g., microphone or ultrasonic transducer).

In one embodiment, an adhesive strain sensing pod has an energy store including a battery; at least one strain-gauge; a printed circuit board assembly (PCBA) electrically coupled to the energy store and the at least one strain-gauge, the PCBA having electronics configured to electrically sense at least one strain signal from the at least one strain-gauge; a protective case for protecting the at least one strain-gauge and the PCBA; a sensor adhesive including a thermally activated adhesive film for adhering a lower surface of the strain-gauge to a surface of a structural element; a pressure pad positioned at a lower region of the protective case, the pressure pad conveying a force, applied to the protective case during installation of the adhesive strain sensing pod, to evenly press the at least one strain-gauge against the surface of the structural element; a housing adhesive, applied to a lower edge of the protective case, for adhering the protective case to the surface of the structural element; and a protective film sized to cover, and applied to, a lower area of the protective case to protect the sensor adhesive and the housing adhesive. The at least one strain-gauge is retained within, and aligned with, the protective case to expose the sensor adhesive for coupling with the surface of the structural element when the protective film is removed.

In another embodiment, an adhesive strain sensing pod includes an energy store, at least one strain sensor, electronics electrically coupled to the energy store and the at least one strain sensor and configured to electrically sense at least one strain signal from the at least one strain sensor, and a sensor adhesive for adhering a lower surface of the strain sensor to a surface of a structural element.

In another embodiment, a method adheres a strain sensor to a surface of a structural element. The method includes rupturing, in response to a force applied to press a protective case of an adhesive strain sensing pod containing the strain sensor against the surface, a fragile pouch containing a sensor adhesive, to spread the sensor adhesive between the strain sensor and the surface; and transferring at least part of the force to press the strain sensor towards the surface. The pressure of the strain sensor against the surface results in a thin layer of the adhesive forming a bond between the strain sensor and the surface.

In another embodiment, a method adheres a strain sensor to a surface of a structural element. The method includes transferring at least part of a force, applied to press a protective case of an adhesive strain sensing pod containing the strain sensor against the surface, to press the strain sensor towards the surface; and operating an electrical element to activate a thermally activated adhesive film positioned between the strain sensor and the surface. The pressure of the strain sensor against the surface results in a thin layer of the adhesive forming a bond between the strain sensor and the surface when the thermally activated adhesive film is cured.

BRIEF DESCRIPTION OF THE FIGURES

FIG. 5A is a top view of an adhesive strain sensing pod with an octagonally-shaped protective case (housing) that facilitates several orientations of the adhesive strain sensing pod relative to the structural element.

FIG. 5B shows how two of the octagonally-shaped adhesive pods of FIG. 5A may be oriented at 45° relative to each other.

FIG. 5C shows how three of the octagonally-shaped adhesive pods of FIG. 5A may be oriented to sense strains along different directions.

DETAILED DESCRIPTION OF THE EMBODIMENTS

Figure 1A:
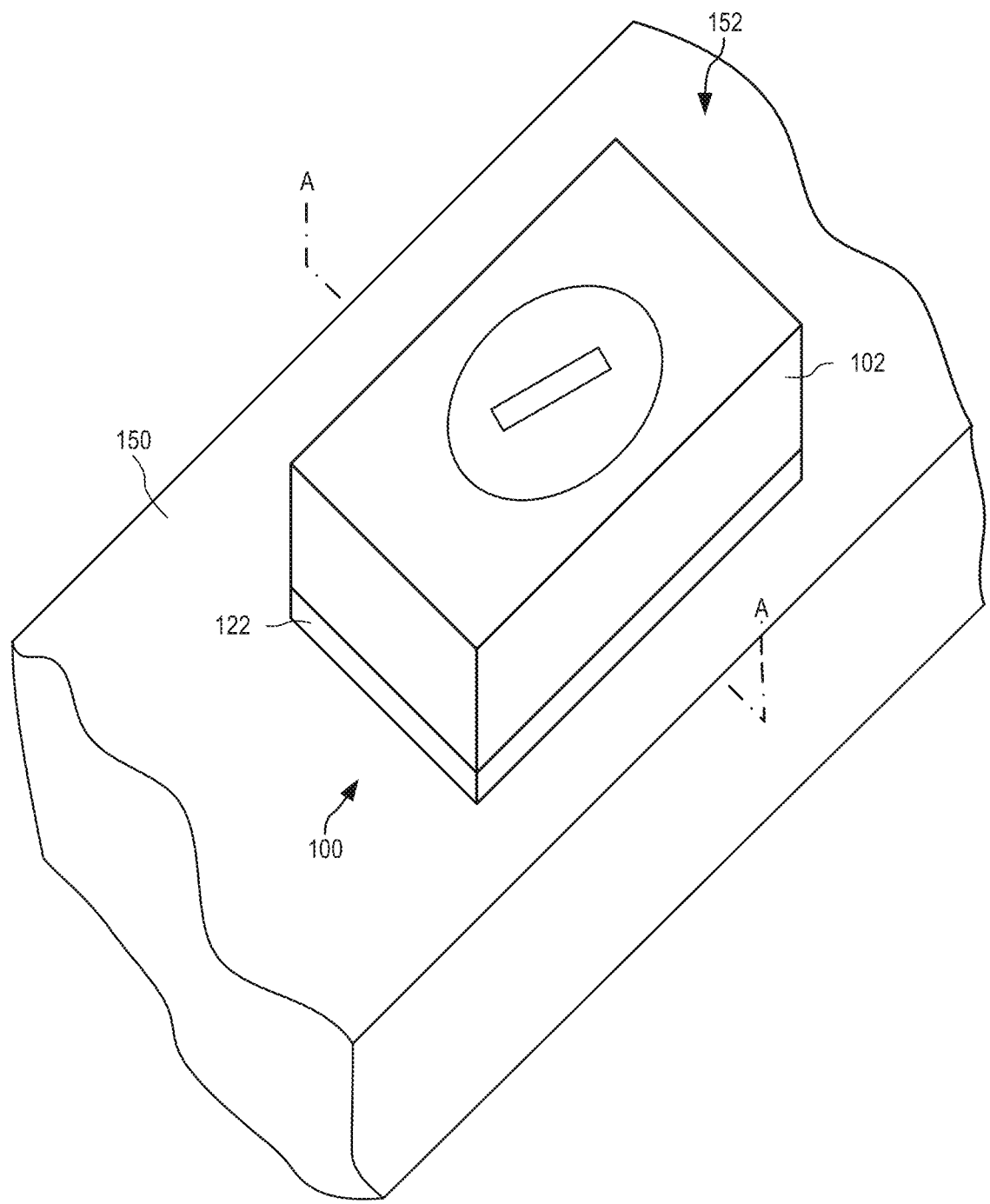
FIG. 1A is a perspective view showing one example stacked adhesive strain sensing pod affixed to a surface of a structural element, in an embodiment.
Figure 1B:
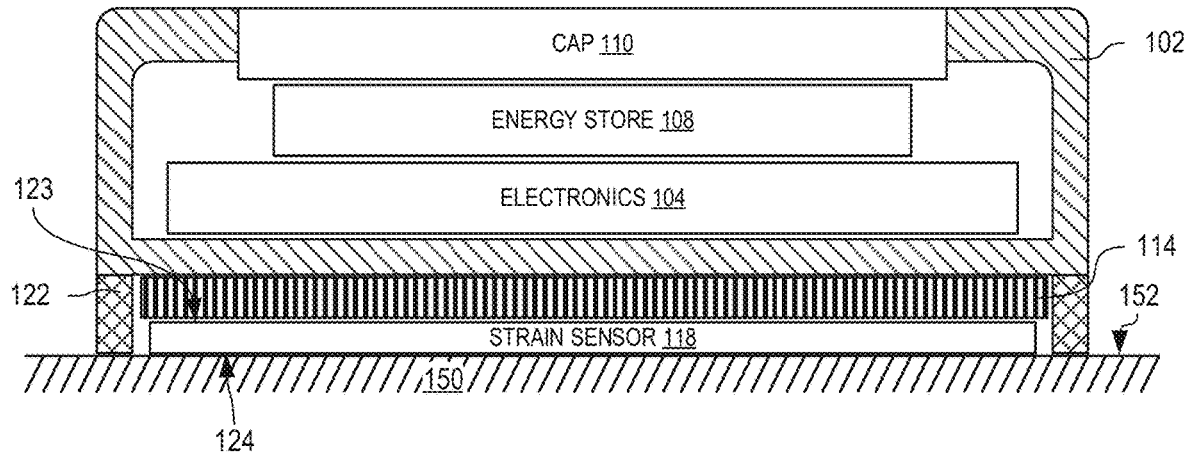
FIG. 1B is a cross-sectional view A-A of the stacked adhesive strain sensing pod of FIG. 1A affixed to the surface of the structural element.

FIG. 1A is a perspective view showing an adhesive strain sensing pod 100 affixed to a surface 152 of a structural element 150, and FIG. 1B shows a cross-section A-A therethrough. FIGS. 1A and 1B are best viewed together with the following description. Adhesive strain sensing pod 100 includes electronics 104 (e.g., (a) a printed circuit board assembly—"PCBA"—with one or more printed circuit boards, (b) one or more flex circuits, (c) discrete components—no PCBA, (c) a single integrated circuit, (d) an ASIC, and so on) with a processor, a wired and/or wireless transceiver, and power management circuit, and so on (e.g., see circuit 2900 of FIG. 29). Adhesive strain sensing pod 100 also includes an energy store 108, and at least one environmental sensor. In the example of FIG. 1, the environmental sensor is a strain sensor 118 that affixes directly to surface 152 for measuring a strain of structural element 150, and energy store 108 is a battery accessed via a cap 110. The components may be enclosed in a protective case 102 that prevents ingress of moisture, dust, and/or other contaminants that may adversely impact operation of strain sensor 118 and/or other components of adhesive strain sensing pod 100.

As shown in FIG. 1, a housing adhesive 122 (e.g., a double-sided tape) may mechanically couple protective case 102 with surface 152. Housing adhesive 122 may cooperate with protective case 102 to prevent ingress of moisture and/or other contaminants to strain sensor 118. Housing adhesive 122 may also be replaced or supplemented with other types of adhesives for different use cases, such as described in more detail below. A bottom surface 124 of strain sensor 118 may be coated with a layer of adhesive (e.g., epoxy or cyanoacrylate) prior to mounting with housing adhesive 122. A pressure pad 114 (e.g., silicone or some other soft-material) may be positioned over a top surface 123 of strain sensor 118 to apply pressure evenly to strain sensor 118 and to ensure that strain sensor 118 properly couples (mechanically) with surface 152 when adhesive strain sensing pod 100 is affixed to structural element 150. For example, protective case 102 and pressure pad 114 may be configured such that a force, applied to press protective case 102 onto structural element 150 during installation, is transferred to press strain sensor 118 onto surface 152. In certain embodiments, pressure pad 114 is omitted and a lower portion of protective casing 102, or supporting structure therein, is positioned over top surface 123 to apply pressure to strain sensor 118 during installation.

Pressure pad 114 may be securely adhered or otherwise attached (for example using slots, membranes, etc.) to a lower surface of protective case 102 such that pressure pad 114 is retained with protective case 102. Strain sensor 118 may be attached to pressure pad 114 (or protective case 102 when pressure pad 114 is omitted) such that strain sensor 118 is retained within protective case 102 prior to installation. For example, a light strength glue or double-sided tape (not shown) may adhere an upper surface of strain sensor 118 to a lower surface of pressure pad 114. Accordingly, in an embodiment, the coupling between strain sensor 118 and pressure pad 114 is weaker than the coupling between pressure pad 114 and protective case 102. This advantageously allows strain sensor 118 to separate from pressure pad 114, while pressure pad 114 is retained with protective case 102. In a further advantage, as described in detail below, orientation of strain sensor 118 with respect to protective case 102 may be maintained prior to installation of adhesive strain sensing pod 100.

By way of explanation, a strain sensor element is a component for sensing strain, that may be part of a strain sensor bridge for example, and that is often referred to as a "strain sensor" (e.g., strain sensor 118) for simplicity. In one embodiment, a strain sensing pod utilizes one strain sensor to measure one strain. For example, a strain sensing pod may use one strain sensor to measure a uniaxial strain. In other embodiments, a strain sensing pod uses more than one strain sensor. For example, the strain sensing pod may use three strain sensors oriented to measure axial, bend and shear strains. In another example, the strain sensing pod uses two or three strain sensors, oriented at various angles, to measure the principal stresses and their angles with respect to an orientation of the adhesive pod. In another example, an adhesive strain sensing pod is configured with two strain sensors in a Poisson gauge arrangement (i.e., the two strain sensors are oriented perpendicularly to each other) to increase strain sensitivity and decrease temperature sensitivity.

Redundancy may be required in critical applications. In this situation, two or more strain sensors may be configured to perform the same measurement (e.g., measure the same strain within the structural element). When the output of all the strain sensors agree to within a tolerance, the average of the strain sensor measurements may be given as the output. When one of the measurements of the strain sensors lies outside of the tolerance, this outlier measurement may be ignored and the average of the remaining strain sensor measurements may be given as the output. An error code indicating an outlier may be generated and transmitted over a wired and/or wireless connection.

A strain sensor bridge is typically implemented as a Wheatstone bridge with four electrically-resistive "legs." Each leg may be one strain sensor element (e.g., to be affixed to surface 152) or one electrical resistor. A strain sensor bridge using only one strain sensor element for one of the legs is termed a quarter bridge. A strain sensor bridge using two strain sensor elements for two of the legs is termed a half bridge. A strain sensor bridge using four strain sensor elements for the four legs is termed a full bridge. When multiple strain sensors are utilized in one pod, a hybrid approach may be used, such as, for example, where one strain sensor bridge in the pod may be configured as a half bridge and another strain sensor bridge in the pod may be configured as a full bridge.

Figure 2:
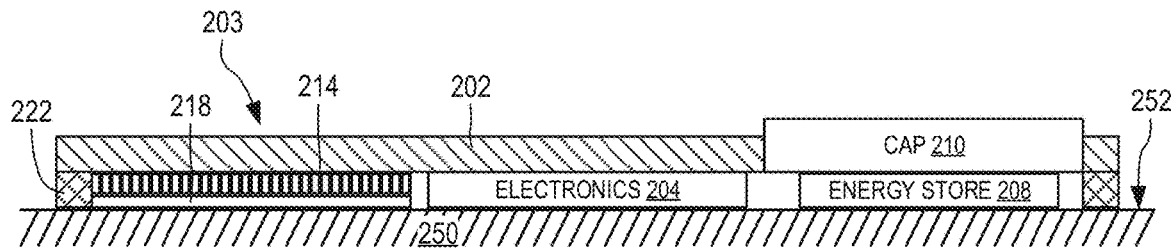
FIG. 2 is a side cross-sectional view of one example of a horizontally aligned adhesive strain sensing pod affixed to a surface of a structural element, in an embodiment.
Figure 3:
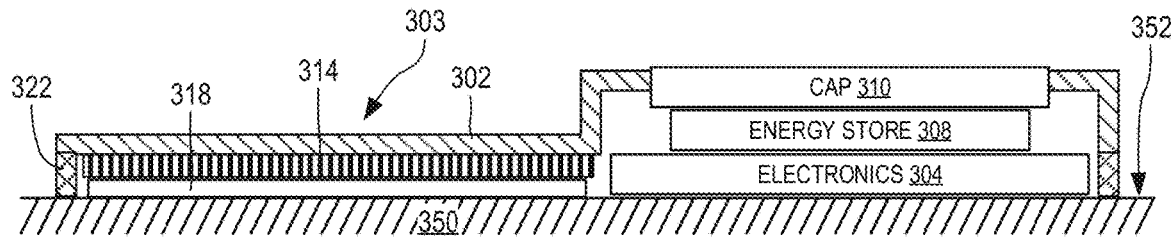
FIG. 3 is a side cross-sectional view of one example of a partially stacked adhesive strain sensing pod affixed to a surface of a structural element, in an embodiment.

FIGS. 2 and 3 respectively show examples of an adhesive strain sensing pod 200 and an adhesive strain sensing pod 300. The examples of FIGS. 2 and 3 illustrate how components of an adhesive strain sensing pod may be configured to achieve different footprints and stack heights. For comparison, the example of FIG. 1 (in which strain sensor 118, electronics 104, and energy store 108 are stacked vertically) has a minimum footprint and maximum stack height. In FIG. 2, adhesive strain sensing pod 200 is shown adhered to a surface 252 of a structural element 250 and includes a protective case 202 (e.g., housing with housing adhesive 222) with a strain sensor 218 (and an overlying pressure pad 214), electronics 204, and an energy store 208 (with cap 210) that are horizontally aligned, thereby minimizing stack height. In certain embodiments, pressure pad 214 may be omitted and protective case 202 is shaped and sized to apply pressure to strain sensor 218. In the example of FIG. 3, pod 300 is shown positioned on a surface 352 of a structural element 350 and includes a protective case 302 (e.g., housing with housing adhesive 322) with a strain sensor 318 (and an overlying pressure pad 314) that are positioned adjacent to electronics 304, on top of which an energy store 308 (with cap 310) is stacked. Thus, the example of FIG. 3 achieves a trade-off between footprint and stack height, so that the pod conveniently and advantageously fits to the physical space of the desired application. In certain embodiments, pressure pad 314 may be omitted and protective case 302 is shaped and sized to abut strain sensor 118 such that pressure applied to protective case 102 is transferred to strain sensor 318.

Each pressure pad 214, 314 above may be securely adhered, or otherwise attached (e.g., slots, membranes, etc.) to a lower surface of protective case 202/302 such that pressure pad 214/314 is retained with protective case 202/302. Strain sensor 218/318 may be attached to pressure pad 214/314 (or protective case 202/302 when pressure pad 214/314 is omitted) such that strain sensor 218/318 is retained within protective case 202/302 prior to installation. For example, a light strength glue or double-sided tape (not shown) may adhere an upper surface of strain sensor 218/318 to a lower surface of pressure pad 214/314. Accordingly, the coupling between strain sensor 218/318 and pressure pad 214/314 is weaker than the coupling between pressure pad 214/314 and protective case 202/302. Advantageously, as described in detail below, orientation of strain sensor 218/318 with respect to protective case 202/302 is maintained prior to installation of adhesive strain sensing pod 200/300.

Figure 4C:
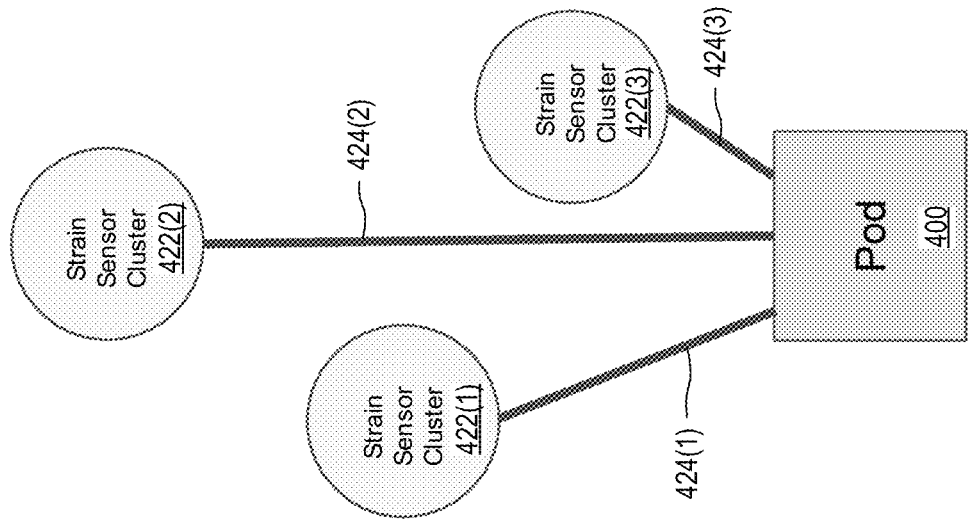
FIGS. 4A, 4B, and 4C, are functional diagrams illustrating example uses of an adhesive pod with one or more externally-wired clusters of strain sensors, in embodiments.
Figure 4B:
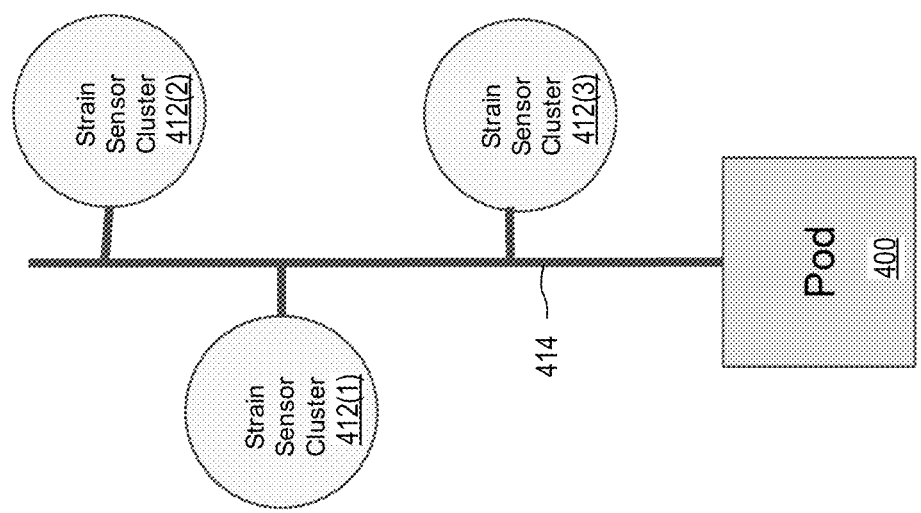
Figure 4A:
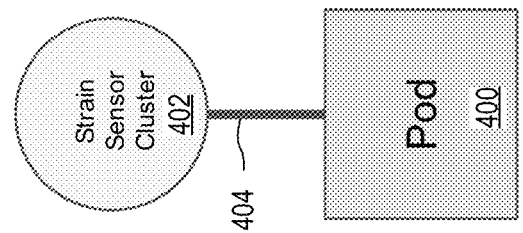

FIGS. 4A, 4B, and 4C are functional diagrams illustrating how one adhesive strain sensing pod 400 may be used with one or more externally-wired strain sensor clusters 402, 412, 422 of strain sensors. Adhesive strain sensing pod 400 may represent any adhesive strain sensing pod disclosed herein (e.g., any of pods 100, 200, 300, 400, 500, 600, 700, 800, 900, 1000, 1200, 1300, 1400, 1500, 1600, 1700, 1800, 1900, 2000, 2200, 2300, 2500, and 2700). In FIG. 4A, one strain sensor cluster 402 is connected to adhesive strain sensing pod 400 via a cable 404. In FIG. 4B, three strain sensor clusters 412(1), 412(2), and 412(3) are connected to an adhesive strain sensing pod 400 via a central cable 414 in a data-bus configuration. In FIG. 4C, three strain sensor clusters 422(1), 422(2), and 422(3) are individually connected to an adhesive strain sensing pod 400 via cables 424(1), 424(2), and 424(3), respectively.

In FIGS. 4A, 4B, and 4C, each strain sensor cluster (e.g., strain sensor cluster 402, 412, or 422) may consist of one or more strain sensors co-mounted in a physical unit. In one embodiment, each strain sensor cluster includes front-end electronics and analog-to-digital converters (ADCs) that digitize the strain sensor signals originating therein. Thus, each strain sensor cluster transmits sensed strains, via the cable or cables, as digital signals to the adhesive pod. In an alternative embodiment, cables 404, 414, 424 may be omitted and each strain sensor cluster wirelessly transmits the sensed strains as digital signals. In another embodiment, ADCs to digitize the strain sensor signals are located in adhesive strain sensing pod 400, wherein each strain sensor cluster transmits sensed strains, via the cable or cables, as analog signals. In these embodiments, each strain sensor cluster and adhesive pod may include a flex connector that electrically connects one cable thereto. Similarly, in the example of FIG. 4C, adhesive strain sensing pod 400 may include several flex connectors for electrically connecting to several strain sensor clusters. While the examples of FIGS. 4B and 4C show three strain sensor clusters connected to one adhesive pod, another number of strain sensor clusters may connect to one adhesive pod without departing from the scope hereof.

Protective Case (Housing)

In general, electronics and strain sensors should remain dry to operate properly. In some environments that are kept dry for testing, the protective case may not be needed. In other scenarios, the protective case may be formed of rigid materials, flexible materials, or a combination thereof (e.g., overmolding). In other example, components like the strain sensor have a conformal coating that protects them against moisture and other environmental elements that may affect readings. In the examples of FIGS. 2 and 3, the protective case 102, 202 may be formed with a flexible material in the region 203/303 above the strain sensor to permit pressure applied (e.g., with a clamp) to protective case 202/302 to be transferred to the strain sensor while adhesive applied thereto cures. For example, a softer material may be used in regions 203/303 of protective case 202/302 above the strain sensor.

In one embodiment, the protective case forms an oil-can bottom that pops in and out, wherein this movement allows pressure to be applied to one or more strain sensors within the protective case while adhesive is curing. Other geometries and configurations may be used, such as corrugations that surround the strain sensor and allow the protective case to flex when pressure is applied thereto while the adhesive sets. In another embodiment, an opening in the protective case above the strain sensor permits direct clamping to the strain sensor while the adhesive sets; a cap or lid may be applied afterwards to close the opening. In another embodiment, internal components of the adhesive strain sensing pod are potted or adhered together in lieu of the protective case; this embodiment may save space, make the geometry more flexible, and produce a more resilient housing.

Pod Geometry

The exterior design of the protective case of the adhesive strain sensing pod may have any design to meet any required branding requirements, adhesive needs, and/or clamping needs. For example, the exterior design may include marking that facilitate alignment of the strain sensor to the structural element. However, in some embodiments the adhesive strain sensing pod may be rectangular to facilitate alignment and/or rotation when mounting and affixing to the surface of the structural element. For example, FIGS. 1, 2, and 3 illustrate various arrangements of elements including the electronics and strain sensor which facilitate selective sizing of the pod to fit the desired application.

FIG. 5A is a top view of an adhesive strain sensing pod 500 with an octagonally-shaped protective case that facilitates several orientations of the adhesive strain sensing pod relative to the structural element. Adhesive strain sensing pod 500 is for example adhesive strain sensing pod 100, 200 or 300 of FIGS. 1, 2 and 3, respectively. FIG. 5B shows how two of the octagonally-shaped adhesive strain sensing pods 500(1) and 500(2) of FIG. 5A may be oriented at 45° relative to each other. FIG. 5C shows how three of the octagonally-shaped adhesive strain sensing pods 500(1), 500(2), and 500(3) of FIG. 5A may be oriented to sense strains along different directions. In FIGS. 5A, 5B, and 5C, an arrow displayed on each protective case indicates a measurement direction of the strain sensor mounted therein. As shown in FIGS. 5B and 5C, neighboring adhesive pods may be abutted to sense strains in directions differing by 45° or a multiple thereof (e.g., 90° in the case of a Poisson configuration). Furthermore, the arrow indicated on the protective case facilitates visual alignment of the adhesive pod relative to an external alignment mark, such as a line or marking on the surface of the structural element. Within each pod, sets of strain sensors may be wired together to form ¼, ½, ¾ and full bridges as desired. These configurations improve signal gain and reduce sensitivity to temperature changes. When several pods are placed in close proximity, their results may be combined to determine principal strains, that are more sensitive to axial strains (Poisson configuration) or bend strains (parallel strain sensors with separation), for example. For example, where multiple adhesive pods are positioned together, data may be collected simultaneously from each adhesive pod. For example, multiple adhesive strain sensing pods may cooperate to sense complex strain and torque patterns of the structural element. In certain embodiments, one of the multiple adhesive pods is designated as master and operates to collect data from other adhesive pods. In other embodiments, a wired and/or wireless hub, or other central device (e.g., a smartphone, cycle computer, etc.) collects data from the multiple adhesive pods for further collective and/or selective processing.

Pod Identification

Figure 6:
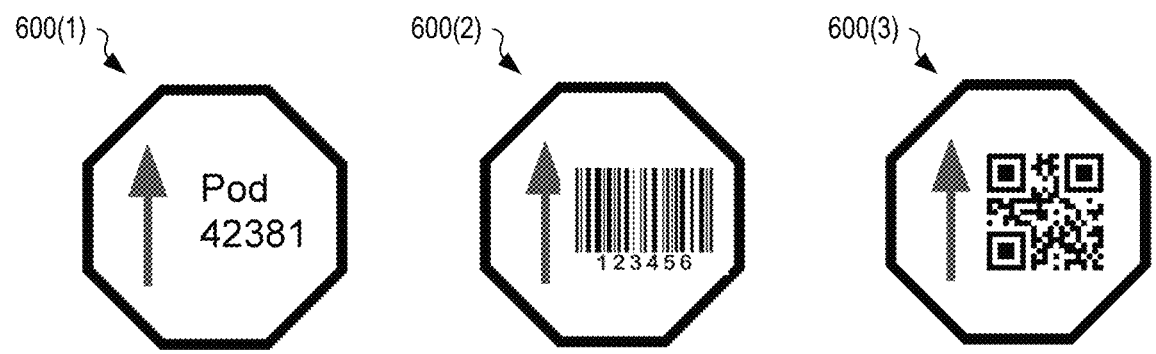
FIG. 6 shows example top views of three protective cases of adhesive strain sensing pods illustrating different example identification marks used for identification and orientation of the adhesive strain sensing pod, in embodiments.

FIG. 6 shows top views of protective cases with different examples of identification marks used to identify each adhesive strain sensing pod 600 (e.g., adhesive strain sensing pod 100, 200, or 300 of FIGS. 1, 2, and 3, respectively). The examples shown in FIG. 6 are: a serial number printed as text on pod 600(1), a barcode on pod 600(2), and a QR code on pod 600(3). An application on a smartphone (or similar portable computing device) may then use a picture of the identification mark to help facilitate wireless configurations and data processing. In FIG. 6, each example identification mark appears on a protective case with an arrow indicating the measurement direction (e.g., strain sensor alignment). In another embodiment, an identification mark appears without the arrow, wherein orientation of the identification mark indicates the measurement direction (e.g., strain sensor alignment).

Pod Adhesion to the Surface of the Structural Element

The strain sensor and adhesive pod may be affixed to a surface in two steps. First, the strain sensor is aligned, bonded (e.g., with adhesive) and clamped to the surface. After the adhesive has set, the protective case of the adhesive pod is affixed to the surface. In some embodiments, the protective case is affixed to the surface with adhesive, as shown in FIG. 1.

In a preferred embodiment, the strain sensor and protective case are affixed to the surface in a single step. Specifically, the adhesives for bonding the strain sensor and the protective case may be prepared in advance and applied simultaneously or sequentially. The entire adhesive pod may then be clamped to the surface, if required, to permit the adhesives to set.

Adhesive Pod Clamping

Most adhesives intended for strain sensors require pressure on the strain sensor while curing to minimize the thickness of the adhesive. Thicker adhesive lines are problematic because the adhesive acts as a buffer that reduces physically coupling between the surface and the strain sensor, i.e., the amount that the strain sensor distorts (i.e., strains) as the structural element distorts (i.e., strains). Depending on the type of surface and surrounding geometry, various clamping methods may be used.

Figure 7:
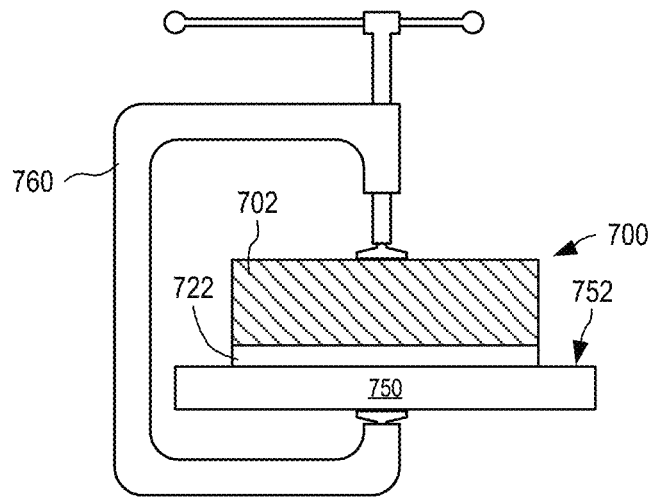
FIG. 7 shows a "C" clamp applying pressure to an adhesive pod while adhesive between the strain sensor and surface sets, in an embodiment.

FIG. 7 shows a "C" clamp 760 applying pressure to an adhesive strain sensing pod 700 while adhesive (not shown) between the strain sensor within adhesive strain sensing pod 700 and a surface 752 of a structural element 750 sets and housing adhesive 722 adheres and seals protective case 702 to surface 752. The example of FIG. 7 requires that structural element 750 be thin enough to fit entirely within "C" clamp 760. A spring clamp, or some other clamping mechanism, may be used instead of "C" clamp 760.

Figure 8:
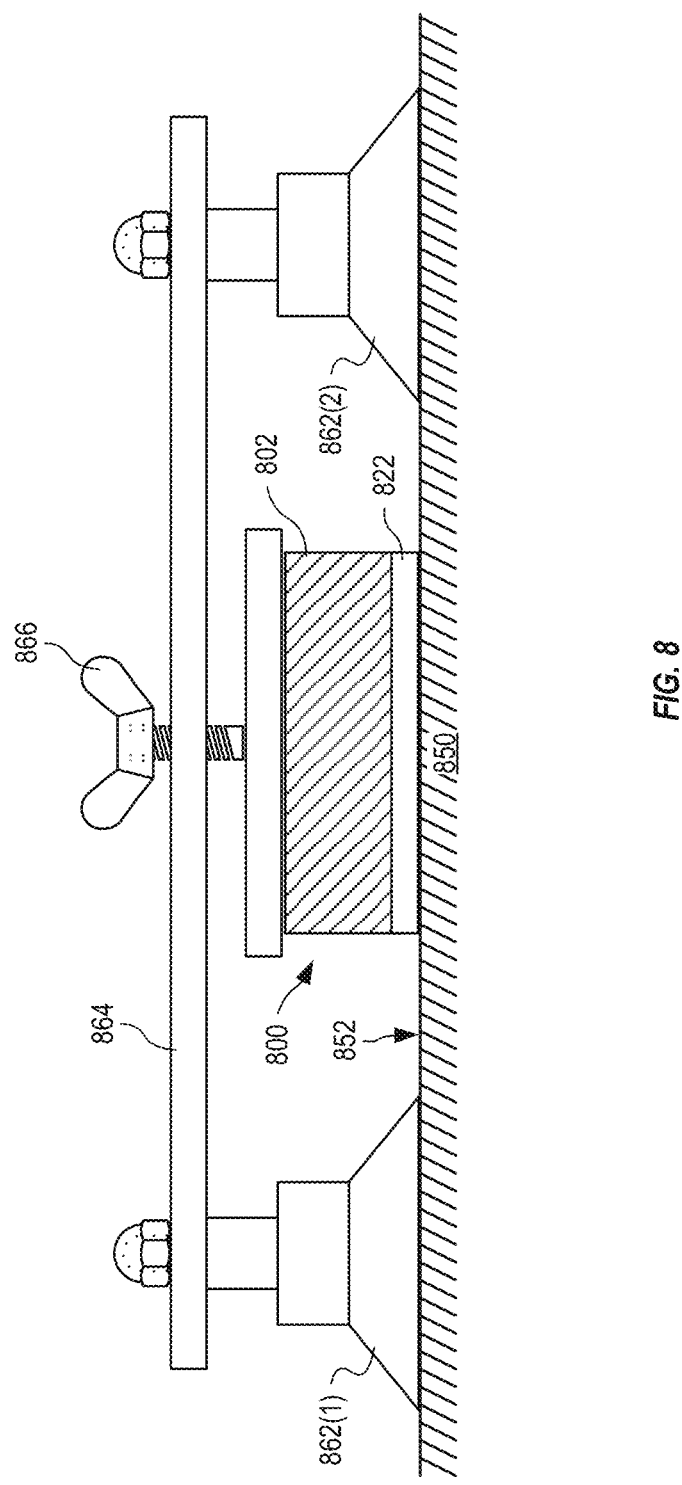
FIG. 8 shows suction cups applying pressure to an adhesive pod while adhesive between the adhesive pod and surface sets, in an embodiment.

FIG. 8 shows one method for clamping an adhesive strain sensing pod 800 to a structural element 850 that is too thick to fit within "C" clamp 760 of FIG. 7 or when only one side of the structural element 850 (e.g. a large wall) is accessible. Suction cups 862(1) and 862(2) attach to a surface 852 of structural element 850 and couple with a frame 864 that is positioned over adhesive strain sensing pod 800. A center screw thread 866 passes through frame 864 and may be tightened to apply pressure to a protective case 802 of adhesive strain sensing pod 800 while adhesive (not shown) between a strain sensor (within protective case 802) and surface 852 sets and housing adhesive 822 adheres and seals protective case 802 to surface 852. Frame 864 may be sized and shaped to couple with one or more features of structural element 850 such that pressure may be applied to protective case 802 of adhesive strain sensing pod 800. In an alternative embodiment, where structural element 850 is magnetic, suction cups 862(1) and 862(2) are replaced by magnets that magnetically secure frame 864 to surface 852.

Figure 9:
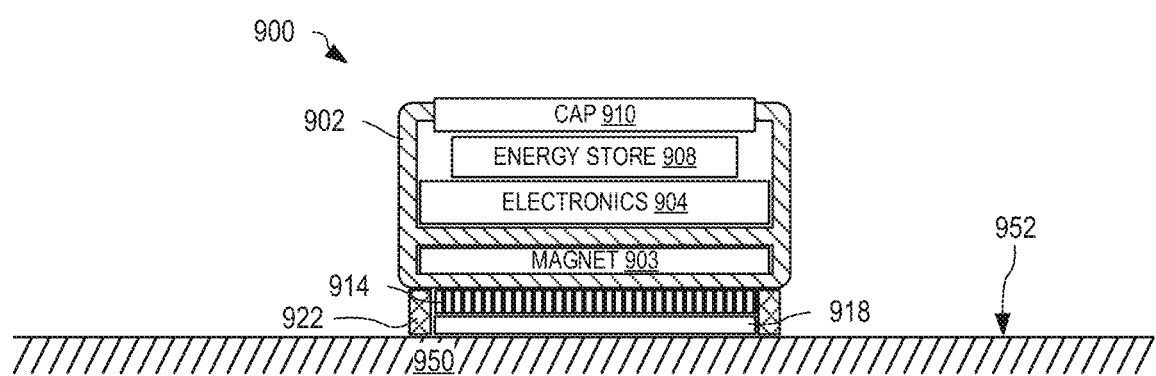
FIG. 9 shows the adhesive strain sensing pod of FIG. 1 configured with a magnet to force the adhesive pod onto a magnetic structural element, in an embodiment.

FIG. 9 shows one example adhesive strain sensing pod 900, similar to adhesive strain sensing pod 100 of FIG. 1, and including electronics 904, an electrical energy store 908 (e.g., a battery, super-capacitor, etc.), and a strain sensor 918 that affixes directly to a surface 952 of a magnetic structural element 950. These components may be enclosed in a protective case 902. Adhesive strain sensing pod 900 may also include a cap 910, where electrical energy store 908 is an exchangeable battery. In the example of FIG. 9, adhesive strain sensing pod 900 is further configured with a magnet 903 that is attracted to magnetic structural element 950 and thereby applies a force to pressure pad 914 to force strain sensor 918 onto surface 952. In the example of FIG. 9, magnet 903 is mounted within protective case 902 between electronics 904 and strain sensor 918, thereby positioning magnet 903 as close to surface 952 as possible (to increase the force applied to pressure pad 914) without interfering with operation of strain sensor 918. In an alternative embodiment, one or more magnets are placed around a perimeter of the protective case as close to the magnetic structural element as possible (to increase the magnetic force applied to pressure pad 914). In certain embodiments, pressure pad 914 may be omitted and protective case 902 is shaped and sized such pressure applied to protective case 902 is transferred to strain sensor 918. For example, strain sensor 918 may be adhered to a lower surface of protective case 902.

Pressure pad 914 may be securely adhered, or otherwise attached (e.g., slots, membranes, protrusions, etc.) to a lower surface of protective case 902 such that pressure pad 914 is retained with protective case 902. Strain sensor 918 may be attached to pressure pad 914 (or protective case 902 when pressure pad 914 is omitted) such that strain sensor 918 is retained with protective case 902 prior to installation. For example, a glue or double-sided adhesive tape (not shown) may adhere an upper surface of strain sensor 918 to a lower surface of pressure pad 914. Advantageously, for reasons described above, orientation of strain sensor 918 with respect to protective case 902 is maintained prior to installation of adhesive strain sensing pod 900.

In certain embodiments, adhesive strain sensing pod 900 may include a housing adhesive 922 that may adhere protective case 902 to surface 952 to form protective sidewalls that prevents intrusion of water and dirt onto strain sensor 918.

In another embodiment, one or more magnets clamp the protective case down over the strain sensor after adhesive is applied to the strain sensor and the strain sensor is positioned on the surface. An additional magnet may be placed above the strain sensor so that when the protective case is clamped down, the additional magnet applies a downward magnetic force on the strain sensor. The additional magnet may stay in place during operation of the adhesive pod, or may be removed as desired.

In another embodiment, a lower portion of the protective case is hermetic, and therefore capable of holding vacuum. The protective case may be formed with an access port through which the internal gas of the adhesive pod may be removed (e.g., with a vacuum pump). When the interior of the adhesive pod is evacuated, external pressure on the protective case pushes down on the strain sensor and the perimeter of the protective case, thereby sealing the adhesive pod against the surface.

Self-Adhering Strain Sensing Pod

For embodiments disclosed herein, a goal is to make the adhesive strain sensing pod simple to install, such that a consumer or company purchasing the product for their own equipment, may easily and successfully install it themselves. Accordingly, the product is specifically designed with this goal and may be supplied as a kit that includes all products and tools needed for successful self-installation of adhesive strain sensing pods.

Cyanoacrylates

Figure 10:
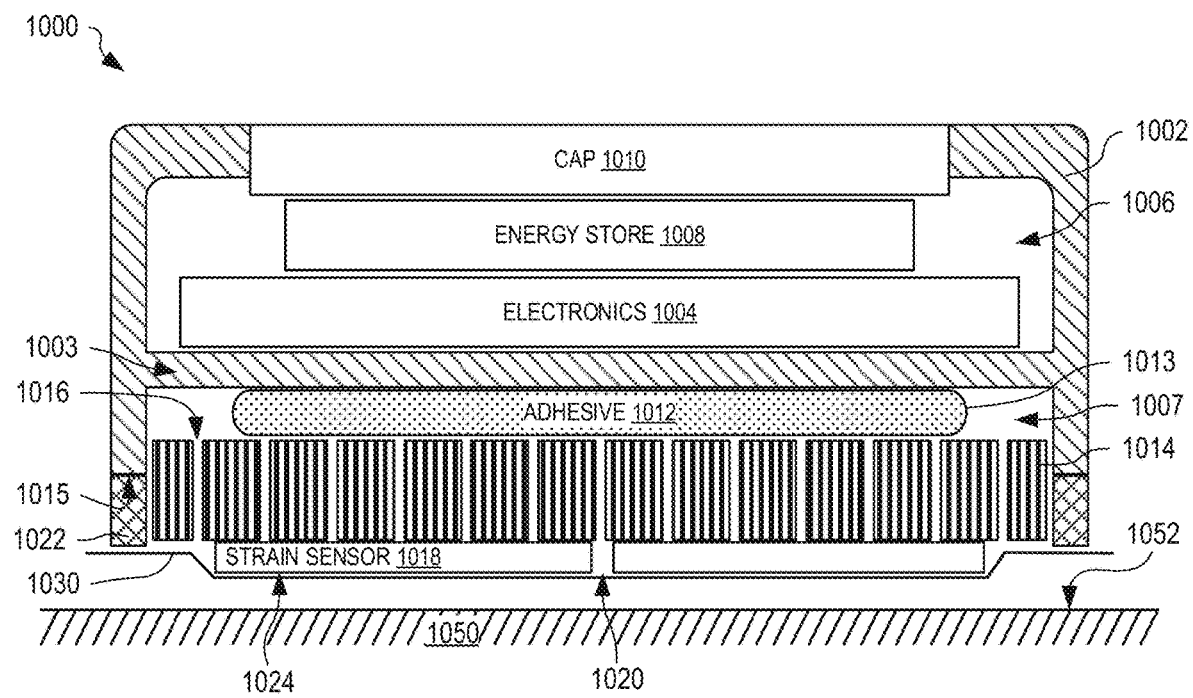
FIG. 10 is a cross section through one example adhesive strain sensing pod, prior to installation, in an embodiment.
Figure 11:
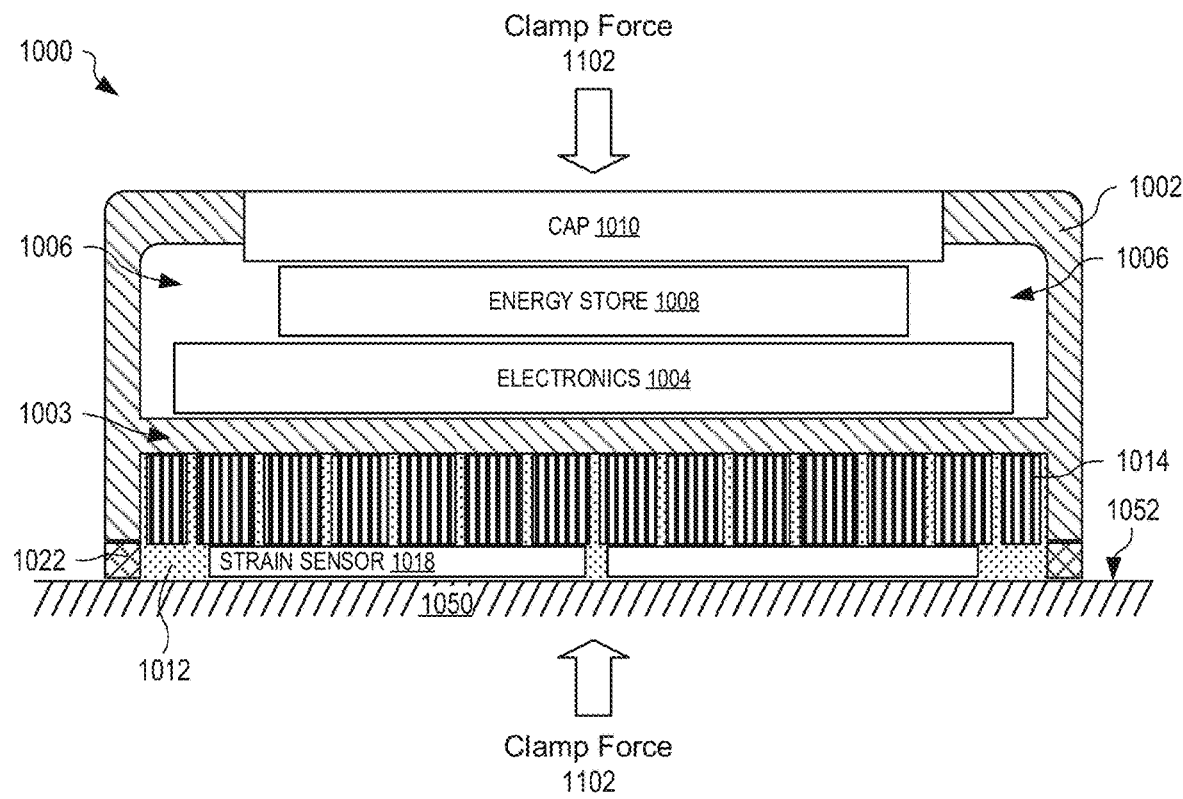
FIG. 11 is a cross section through the adhesive strain sensing pod of FIG. 10 after installation, in an embodiment.

FIG. 10 is a cross section through one example adhesive strain sensing pod 1000, prior to installation of adhesive strain sensing pod 1000 on a structural element 1050 and using a single-component reagent adhesive (e.g., cyanoacrylates). FIG. 11 is a cross section through adhesive strain sensing pod 1000 of FIG. 10, during installation of adhesive strain sensing pod 1000 on structural element 1050. FIGS. 10 and 11 respectively show before installation and after installation of adhesive strain sensing pod 1000 and are best viewed together with the following description.

Adhesive strain sensing pod 1000 has a semi-rigid protective case 1002 that forms an upper region 1006 separated from a lower region 1007 by an internal wall 1003. Upper region 1006 includes electronics 1004 and an energy store 1008 (e.g., a battery, capacitor, super-capacitor, etc.) that may be accessible (e.g., replaceable) through a cap 1010. In certain embodiments, internal wall 1003 may be a membrane. In certain other embodiments, internal wall 1003 may be formed by electronics 1004 (e.g., (a) a printed circuit board assembly—"PCBA"—with one or more printed circuit boards, (b) one or more flex circuits, (c) discrete components—no PCBA, (c) a single integrated circuit, (d) an ASIC, and so on). As shown in FIG. 10, prior to installation, lower region 1007 includes a fragile pouch 1013 containing a sensor adhesive 1012, a pressure pad 1014, and a strain sensor 1018. Housing adhesive 1022 (e.g., double-sided tape) may be attached to a lower edge 1015 of protective case 1002. Optionally, housing adhesive 1022 and lower surface 1024 of strain sensor 1018 may be covered by a protective film 1030 to prevent contamination of lower surface 1024 of strain sensor 1018. Protective film 1030 is removed prior to installation of adhesive strain sensing pod 1000.

Fragile pouch 1013 is positioned adjacent to internal wall 1003. Pressure pad 1014 has a plurality of perforations 1016 and is positioned between fragile pouch 1013 and strain sensor 1018, such that strain sensor 1018 abuts pressure pad 1014. Strain sensor 1018 may have at least one hole 1020 to facilitate passage of sensor adhesive 1012 towards a prepared surface 1052 of structural element 1050. Perforations 1016 and hole 1020 facilitate passage of sensor adhesive 1012, when fragile pouch 1013 is ruptured, from fragile pouch 1013 to a lower surface 1024 of strain sensor 1018 and a prepared surface 1052. For example, positioning and size of the at least one hole 1020 may be selected to ensure sensor adhesive 1012 flows between lower surface 1024 and prepared surface 1052. However, a certain pressure is required to rupture fragile pouch 1013, thereby ensuring that sufficient force is applied for correct bonding of the strain sensor 1018 to prepared surface 1052 before sensor adhesive 1012 is released.

Lower surface 1024 may be uneven and may be prepared by scoring or etching of grooves into lower surface 1024 to facilitate capillary action of sensor adhesive 1012 between surfaces 1024 and 1052. In certain embodiments, a thin layer of material (not shown) may be lightly adhered to strain sensor 1018, and may include fibers that wick sensor adhesive 1012 between surfaces 1024 and 1052. For example, the fibers may be woven, like a fabric, or may be a series of roughly parallel fibers. In certain embodiments, these fibers may be a thin sheet of paper.

In one example of installation, once prepared surface 1052 is ready to receive adhesive strain sensing pod 1000, protective film 1030 is removed and adhesive strain sensing pod 1000 is positioned on structural element 1050. A clamp force 1102 (or other generated force) is then applied such that adhesive strain sensing pod 1000 and structural element 1050 are pressed together. As protective case 1002 is forced towards prepared surface 1052, strain sensor 1018 and pressure pad 1014 are pushed up into lower region 1007 and fragile pouch 1013 is ruptured, allowing sensor adhesive 1012 to flow through the plurality of perforations 1016 in pressure pad 1014, through and around strain sensor 1018 such that capillary action draws sensor adhesive 1012 between surfaces 1024 and 1052. Housing adhesive 1022 seals edges of protective case 1002 against surface 1052, thereby preventing sensor adhesive 1012 from escaping from lower region 1007. While clamp force 1102 is applied, protective case 1002, and particularly internal wall 1003, causes pressure pad 1014 to press strain sensor 1018 against prepared surface 1052, thereby ensuring good adhesion of strain sensor 1018 to structural element 1050. Once sensor adhesive 1012 is set, clamp force 1102 may be removed, and sensor adhesive 1012 retains adhesive strain sensing pod 1000 on structural element 1050. In certain embodiments, one or more of fragile pouch 1013, pressure pad 1014 and housing adhesive 1022 are configured such that sensor adhesive 1012 is not released until clamp force 1102 is of sufficient strength for correctly attaching strain sensor 1018 to prepared surface 1052. In certain embodiments, where sensor adhesive 1012 may shrink and cause residual stress on strain sensor 1018, a post-cure heat treatment may be applied to remove any residual stresses. Sensor adhesive 1012 is preferably of a type that does not shrink during curing.

In certain embodiments, components within protective case 1002 have a conformal coating for protection and thus housing adhesive 1022 need not form a seal between protective case 1002 and prepared surface 1052.

Figure 12:
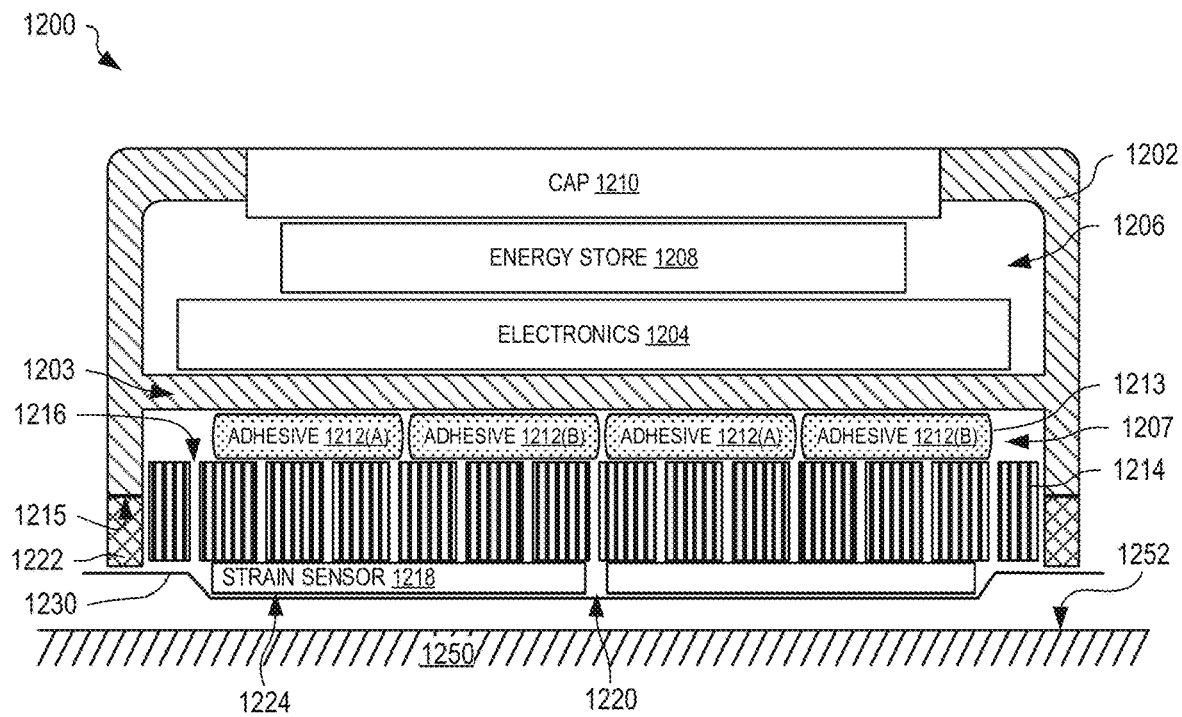
FIG. 12 is a cross section through one example adhesive strain sensing pod, prior to installation, including a two-part adhesive, in an embodiment.

FIG. 12 is a cross section through one example adhesive strain sensing pod 1200, prior to installation, that is similar to adhesive strain sensing pod 1000 of FIG. 10 but includes a two-part (two component) sensor adhesive 1212 (e.g., two-part epoxy, or adhesive with accelerant) in place of sensor adhesive 1012.

Adhesive strain sensing pod 1200 includes a semi-rigid protective case 1202 that forms an upper region 1206 and a lower region 1207 separated by an internal wall 1203. In certain embodiments, internal wall 1203 may be a membrane. In certain other embodiments, internal wall 1203 may be formed by electronics 1204. Upper region 1206 includes electronics 1204 and an energy store 1208 that may be accessible (e.g., replaceable) through a cap 1210. Lower region 1207 includes a pressure pad 1214, and a strain sensor 1218. A housing adhesive 1222 (e.g., a double-sided tape) may be attached to a lower edge 1215 of protective case 1202. Optionally, housing adhesive 1222 and lower surface 1224 of strain sensor 1218 may be covered by a protective film 1230 to prevent contamination of lower surface 1224 of strain sensor 1218. Protective film 1230 is removed prior to installation of adhesive strain sensing pod 1200.

In this example, sensor adhesive 1212 includes adhesive parts 1212(A) and 1212(B), and each part is contained in a separate fragile pouch 1213 that prevents the adhesive parts 1212(A) and 1212(B) from mixing prior to installation of adhesive strain sensing pod 1200. The example of FIG. 12 shows four separate fragile pouches 1213, spatially organized to allow the different adhesive parts 1212(A) and 1212(B) of sensor adhesive 1212 to mix when adhesive strain sensing pod 1200 is installed onto prepared surface 1252 of structural element 1250. More fragile pouches 1213 may be used to increase mixing, if needed, of adhesive parts 1212(A) and 1212(B) during installation of adhesive strain sensing pod 1200, for example. In certain embodiments, perforations 1216 are sized and shaped to mix adhesives 1212(1) and 1212(B). In certain embodiments, adhesive part 1212(B) is an activator that is applied to lower surface 1224 of strain sensor 1218 such that when adhesive part 1212(A) is released from fragile pouches 1213, mixing is not required and curing is initiated when adhesive part 1212(A) comes into contact with adhesive part 1212(B). Particularly, adhesive part 1212(A) may have low viscosity such that capillary action draws adhesive part 1212(A) between lower surface 1224 and prepared surface 1252, before curing is completed.

To install adhesive strain sensing pod 1200, once prepared surface 1252 is ready to receive adhesive strain sensing pod 1200, protective film 1230 is removed and adhesive strain sensing pod 1200 is positioned on structural element 1250. A clamp force (e.g., clamp force 1102 of FIG. 11, or other generated force) is then applied such that adhesive strain sensing pod 1200 and structural element 1250 are pressed together. As protective case 1202 is forced towards prepared surface 1252, strain sensor 1218 and pressure pad 1214 are pushed into lower region 1207 and fragile pouches 1213 are ruptured, allowing adhesive parts 1212(A) and 1212(B) to mix and flow through the plurality of perforations 1216 in pressure pad 1214, through and around strain sensor 1218 such that capillary action draws sensor adhesive 1212 between surfaces 1224 and 1252. For example, adhesive parts 1212(A) and 1212(B) mix together as they are squeezed through perforations 1216 of pressure pad 1214. Housing adhesive 1222 seals edges of protective case 1202 against surface 1252, thereby preventing sensor adhesive 1212 from escaping from lower region 1207. While the clamp force is applied, protective case 1202, and particularly internal wall 1203, causes pressure pad 1214 to press strain sensor 1218 against prepared surface 1252, thereby ensuring good adhesion of strain sensor 1218 to structural element 1250. Once sensor adhesive 1212 is set, the clamp force may be removed, and sensor adhesive 1212 retains adhesive strain sensing pod 1200 on structural element 1250.

Figure 13:
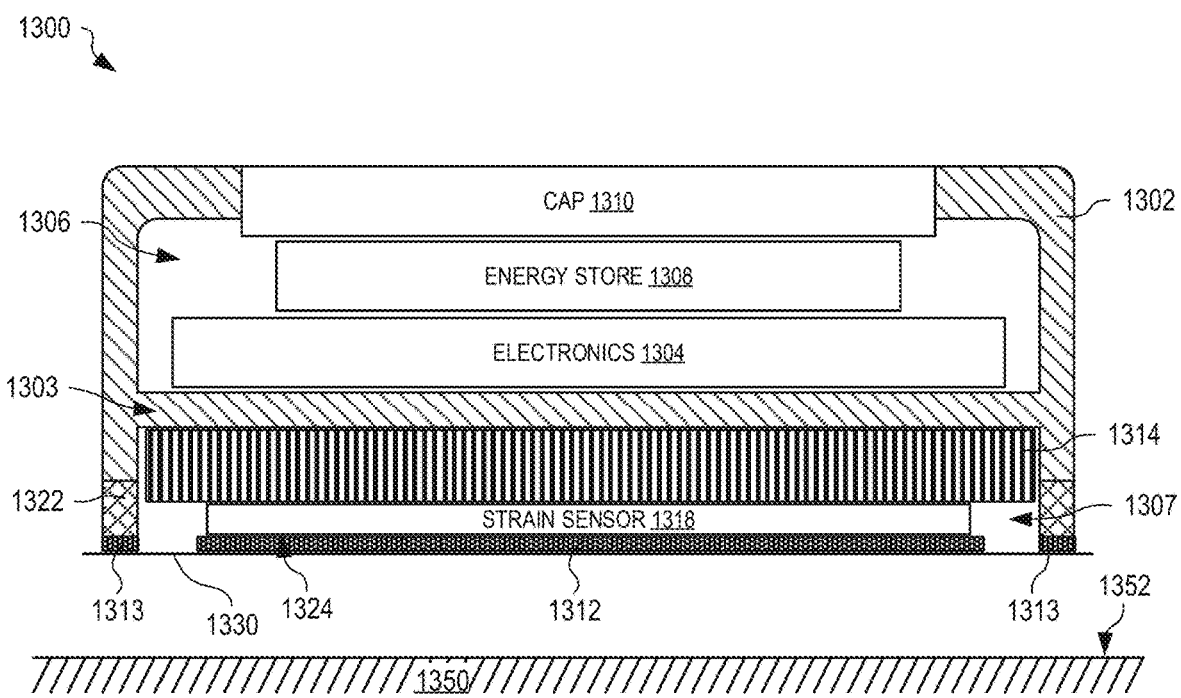
FIG. 13 is a cross section through one example adhesive strain sensing pod, prior to installation, including an air-cured adhesive, in an embodiment.

FIG. 13 is a cross section through one example adhesive strain sensing pod 1300, prior to installation, that is similar to adhesive strain sensing pod 1000 of FIG. 10, but includes an air-cured or water vapor-cured sensor adhesive 1312. Adhesive strain sensing pod 1300 includes a semi-rigid protective case 1302 that forms an upper region 1306 and a lower region 1307 separated by an internal wall 1303. In certain embodiments, internal wall 1303 may be a membrane. In certain other embodiments, internal wall 1303 may be formed by electronics 1304. Upper region 1306 includes electronics 1304 and an energy store 1308 (e.g., a battery, capacitor, super-capacitor, etc.) that may be accessible through a cap 1310. Lower region 1307 includes a pressure pad 1314 and a strain sensor 1318. Air-cured or water vapor-cured sensor adhesive 1312 is applied to a lower strain sensor surface 1324 of strain sensor 1318 and covered by a protective film 1330. Optionally, the same or a different air-cured adhesive 1313 may be applied to a lower surface of a housing adhesive 1322 and covered by protective film 1330. Protective film 1330 thereby inhibits premature curing of air-cured sensor adhesive 1312 and 1313 and prevents inadvertent adhesion of air-cured sensor adhesive 1312 and 1313 to other objects prior to installation of adhesive strain sensing pod 1300. In certain embodiments, lower region 1307 contains sufficient air and/or water vapor to initiate curing of sensor adhesive 1312 once protective film 1330 is removed. In other embodiments, prepared surface 1352, under normal ambient conditions, has sufficient air or water vapor to initiate curing of sensor adhesive 1312. In certain embodiments, curing of sensor adhesive 1312 is triggered by OH molecules and is thereby initiated by both air and water vapor.

To install adhesive strain sensing pod 1300, once prepared surface 1352 is ready to receive adhesive strain sensing pod 1300, protective film 1330 is removed from air-cured adhesives 1312 and 1313 and adhesive strain sensing pod 1300 is positioned on structural element 1350. A clamp force (e.g., clamp force 1102, magnetic force, vacuum force, or other similar force) is then applied such that adhesive strain sensing pod 1300 and structural element 1350 are pressed together. Housing adhesive 1322 seals edges of protective case 1302 against prepared surface 1352. While the clamp force is applied, protective case 1302, internal wall 1303, causes pressure pad 1314 to press strain sensor 1318 against prepared surface 1352, thereby ensuring good adhesion of strain sensor 1318 to structural element 1350. Once adhesive 1312/1313 is set, the clamp force may be removed, and adhesive 1312/1313 retains adhesive strain sensing pod 1300 on structural element 1350.

Figure 14:
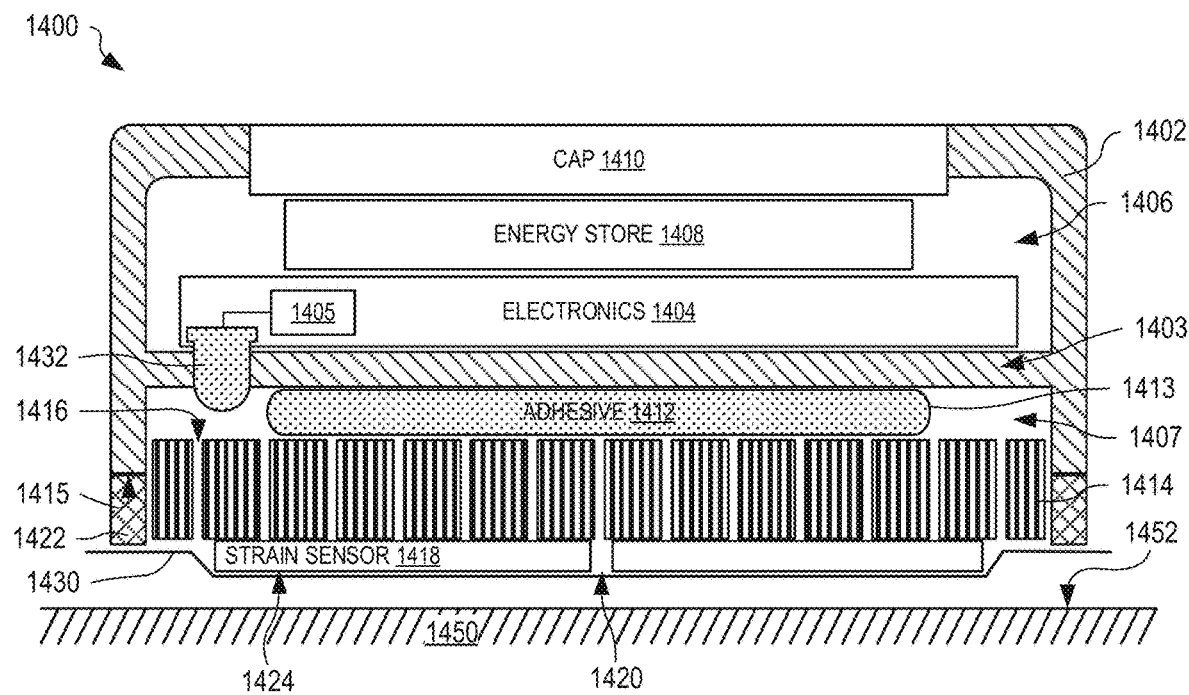
FIG. 14 is a cross section through one example adhesive strain sensing pod, prior to installation, including an ultraviolet (UV) curing adhesive and at least one UV source, in an embodiment.

FIG. 14 is a cross section through one example adhesive strain sensing pod 1400, prior to installation, that is similar to adhesive strain sensing pod 1000 of FIG. 10 but includes an ultra-violet (UV) curing sensor adhesive 1412 and at least one UV source 1432. Adhesive strain sensing pod 1400 includes a semi-rigid protective case 1402 that forms an upper region 1406 and a lower region 1407 separated by an internal wall 1403. In certain embodiments, internal wall 1403 may be a membrane. In certain other embodiments, internal wall 1403 may be formed by electronics 1404. Upper region 1406 includes electronics 1404 and an energy store 1408 that may be accessible (e.g., replaceable) through a cap 1410. Lower region 1407 includes a fragile pouch 1413 containing UV curing sensor adhesive 1412, a pressure pad 1414, and a strain sensor 1418. A housing adhesive 1422 (e.g., a double-sided tape) may be attached to a lower edge 1415 of protective case 1402. Optionally, housing adhesive 1422 and lower surface 1424 of strain sensor 1418 may be covered by a protective film 1430 to prevent contamination of lower surface 1424 of strain sensor 1418. Protective film 1430 is removed prior to installation of adhesive strain sensing pod 1400.

Fragile pouch 1413 is positioned adjacent internal wall 1403. Pressure pad 1414 has a plurality of perforations 1416 and is positioned between fragile pouch 1413 and strain sensor 1418. Perforations 1416 and at least one hole 1420 through strain sensor 1418 facilitate passage of UV curing sensor adhesive 1412, when fragile pouch 1413 is ruptured, from fragile pouch 1413 to a lower surface 1424 of strain sensor 1418 and a prepared surface 1452. Lower surface 1424 may be uneven and may be prepared by scoring or etching of grooves into lower surface 1424 to facilitate capillary action of UV curing sensor adhesive 1412 between surfaces 1424 and 1452. In certain embodiments, a thin layer of material (not shown) may be lightly adhered to strain sensor 1418, and may include fibers that wick UV curing sensor adhesive 1412 between surfaces 1424 and 1452. For example, the fibers may be woven, like a fabric, or may be a series of roughly parallel fibers. In certain embodiments, these fibers may be a thin sheet of paper. Once adhesive strain sensing pod 1400 is clamped to structural element 1450, UV source 1432 is activated to cure UV curing sensor adhesive 1412. Adhesive strain sensing pod 1400 may include an activation circuit 1405 (e.g., on electronics 1404) that activates UV source 1432 for a predefined period when triggered. For example, pressure pad 1414 and at least parts of strain sensor 1418 may be UV transparent to allow UV light to pass from UV source to UV curing sensor adhesive 1412 released from fragile pouch 1413. Many types of plastic, silicone and glass are UV transparent or at least have a fair degree of UV transmissibility to permit UV curing to take place. For clarity of illustration, only one UV source 1432 is shown in FIG. 14; however, adhesive strain sensing pod 1400 may have more than one UV source 1432 to ensure UV curing sensor adhesive 1412 is fully cured.

In one example of installation, once prepared surface 1452 is ready to receive adhesive strain sensing pod 1400, protective film 1430 is removed and adhesive strain sensing pod 1400 is positioned on prepared surface 1452. A clamp force (e.g., clamp force 1102, FIG. 11, or other force) is applied to press adhesive strain sensing pod 1400 and structural element 1450 together. As protective case 1402 is forced towards prepared surface 1452, strain sensor 1418 and pressure pad 1414 are pushed up into lower region 1407 and fragile pouch 1413 is ruptured, allowing UV curing sensor adhesive 1412 to flow through the plurality of perforations 1416 in pressure pad 1414, through and around strain sensor 1418 such that capillary action draws UV curing sensor adhesive 1412 between surfaces 1424 and 1452. Housing adhesive 1422 seals edges of protective case 1402 against prepared surface 1452, thereby preventing UV curing sensor adhesive 1412 from escaping from lower region 1407. While the clamp force is applied, protective case 1402, and particularly internal wall 1403, causes pressure pad 1414 to press strain sensor 1418 against prepared surface 1452. Activation circuit 1405 is then triggered by a mechanical, electrical or software switch or by some external source (e.g., by detecting one or more of clamp force 1102, movement of pressure pad 1414, a wireless signal, a proximity sensor, and so on) to activate UV source 1432 for a predefined period to cure UV curing sensor adhesive 1412, and strain sensor 1418 adheres to structural element 1450. In certain embodiments, electronics 1404 may delay activation of UV source 1432 for a predefined period to allow UV curing sensor adhesive 1412 to wick between the at least one strain sensor 1418 and the prepared surface 1752. Once UV curing sensor adhesive 1412 is set, the clamp force may be removed, and UV curing sensor adhesive 1412 retains adhesive strain sensing pod 1400 on structural element 1450.

Strain Sensor Signal Sampling

Strain sensors incur small changes in resistance when their length is changed by forces applied to the structural element to which they are attached. As such, the measuring circuit is susceptible to electrical noise and effects (e.g., resistance) of lead wire length. Therefore, it is imperative to place the measuring circuitry and ADC close to the strain sensors to minimize these effects. This may be accomplished by positioning the PCB near the strain sensor assembly as shown in adhesive strain sensing pods 1000, 1200, 1300, and 1400.

Figure 15:
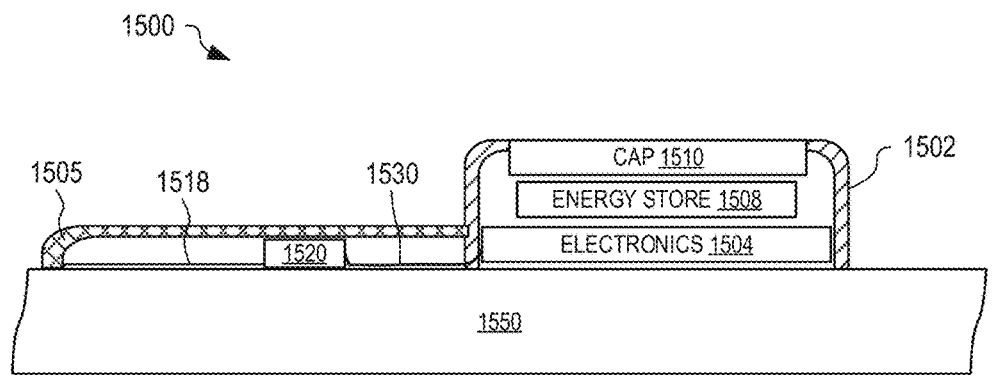
FIG. 15 shows analog and ADC circuitry positioned adjacent a strain sensor attached to a structural element to send digitized signals to electronics within an adjacent housing.

FIG. 15 shows an alternative adhesive strain sensing pod 1500 where analog and ADC circuitry 1520 (e.g., a portion of the measuring circuitry) is positioned next to strain sensor 1518 at a surface of structural element 1550 and operates to send digitized signals, via a flex connector 1530 (e.g., a flex circuit) to electronics 1504 within an adjacent protective case 1502 that may also include an energy store 1508 that may be accessible/replaceable via a cap 1510. For example, flex connector 1530 may be part of a flex circuit that includes analog and ADC circuitry 1520. The ADC may be carried out using a general-purpose ADC built into commonly used microcontrollers. These ADCs are usually low resolution, so that over-sampling may be necessary to increase the resolution to an acceptable level. On the other hand, an external ADC (xADC—e.g., a separate integrated circuit) may be used. An xADC may be selected to deliver the desired resolution and sampling rate. Further, the selected xADC may also include low-pass filtering (or external circuitry may be added to accomplish the same functionality). In embodiments, protective case 1502 may include an extension 1505 (which may be similar to flexible portion 1605 of FIG. 16) for protecting strain sensor 1518, analog and ADC circuitry 1520, and flex connector 1530.

Housing

Figure 16:
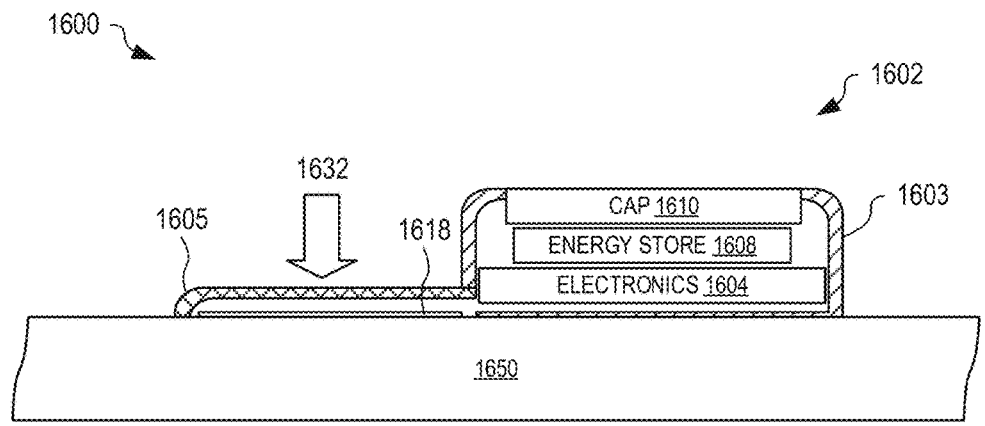
FIG. 16 shows one example adhesive strain sensing pod with a housing formed with a rigid portion and a flexible portion.

In certain embodiments disclosed herein, the strain sensing pod has a single rigid or flexible housing that encapsulates the strain sensor, the electronics, and the energy store (e.g., battery). In other embodiments, the housing has rigid or flexible body that encapsulates the electronics and the energy store, but does not encapsulate the strain sensor which attaches to the prepared surface of the structural element. In yet other embodiments, the housing is rigid or flexible but is open at the bottom to allow the strain sensor to adhere directly to the prepared surface of the structural element. In any of these embodiments, rather than being entirely rigid or flexible, the housing may be formed with a mixed material body such that certain parts of the housing are stiffer and other parts are more flexible. For example, FIG. 16 shows one embodiment where pod 1600 includes a housing 1602 formed with a rigid portion 1603 and a flexible portion 1605. Rigid portion 1603 contains electronics 1604, an energy store 1608 (e.g., battery, capacitor, super-capacitor, etc.), and has a cap 1610 to facilitate replacement of energy store 1608 when implemented as a battery. Flexible portion 1605 covers strain sensor 1618 and, advantageously, flexible portion 1605 of housing 1602 allows a clamp force 1632 to apply pressure to strain sensor 1618 during installation of strain sensor 1618 on structural element 1650. In certain embodiments, housing 1602 may include a pressure pad (e.g., similar to pressure pad 1314 of FIG. 13) that transfers clamp force 1632 to strain sensor 1618. Any of these housings may be opaque, translucent, or completely transparent.

These strain sensing pods may contain three primary classes of subcomponents: 1) surface adhesion and surface sensors, 2) PCB—processor, radio, additional sensors, power management, 3) power supply—battery, solar or other. The above-mentioned housing embodiments treat the pod as a single seamless unit and therefore these subcomponent housings reside in the single pod. However, the housing may be constructed in two or more smaller housings that attach to one another. In this manner, different configurations for different applications could be easily mixed and matched as desired. One such embodiment would have a small housing that attaches to the surface. This housing would provide easy access to ensure the any surface sensors are properly affixed. A second housing could then be constructed that contains the PCB and power supply. Yet another embodiment could have a second and third housing; one that contains the PCB and another for the power supply. In certain embodiments, flex connector 1530 may be implemented as separate wires to form the electrical connections between each sub-housing. Further, to facilitate installation, flex connector 1530 may include at least one connector (e.g., ZIF, Molex, slide-in or other connectors).

By making the housings with at least one corner at 120 degrees, three of the pods can be placed in such a way to form a strain rosette which could then measure the principal strains and their angles with respect to one of the pods. All of these descriptions of strain sensor direction can use a single strain sensor (quarter bridge) or half bridge, three-quarters bridge, or full bridge configurations.

Pod Pressure Equalization

To prevent damage to the pod housing under large ambient pressure changes (e.g. on a plane) a vent hole may be required. This vent hole might contain a Gore-Tex membrane, or similar, to minimize moisture infiltration into the pod. Alternatively, the pod could be potted with a non-conductive material so that all or most of the air surrounding the sensors, electronics and energy store are filled with the potting material. Another option is to construct the pod shell out of a relatively flexible material that can deform to the expected pressure variations without structural integrity damage. The flexible pod material could also be used with the previously described potted electronics.

Housing Adhesive

The pod housing may be affixed to a structural element (e.g., a substrate) using a variety of methods. Various adhesives could be used, including, but not limited to: silicone, UV curable adhesive and double-sided tape (could be foam tape to better conform to uneven surface of the structural element). The pods can also be mechanically attached to the substrate using screws or it could be snapped or twisted into a receptacle on the surface. In certain situations, magnetic or suction cups would also be used for attachment.

Figure 17:
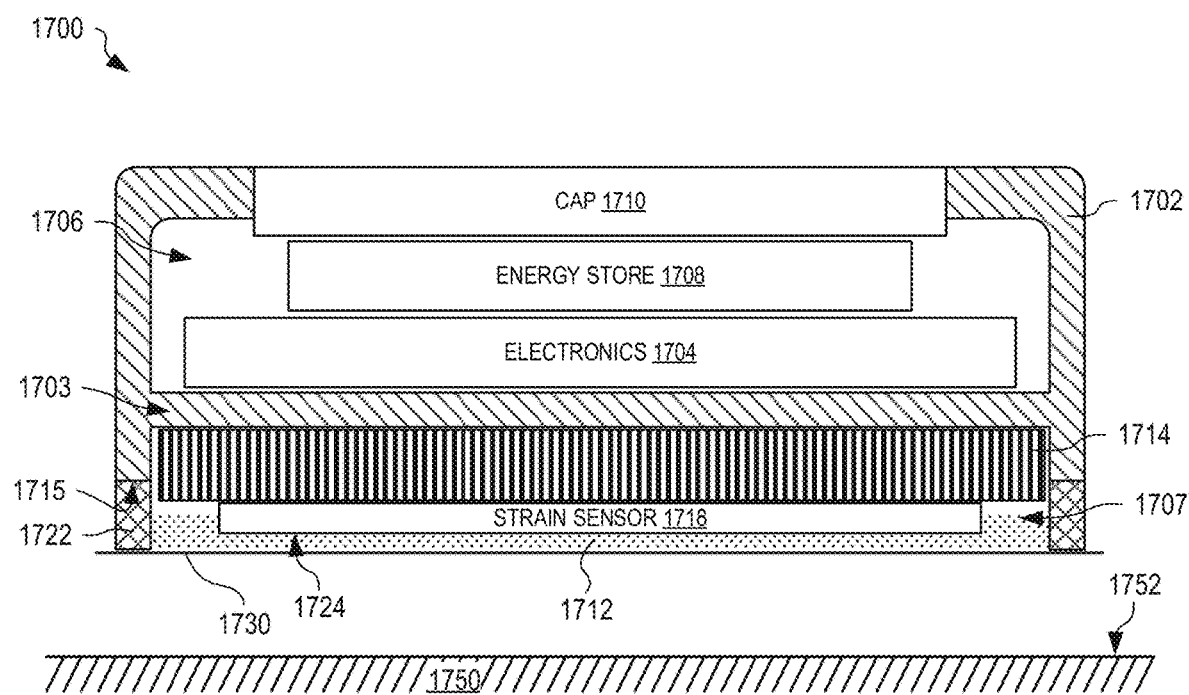
FIG. 17 is a cross section through one example adhesive strain sensing pod, prior to installation on a structural element using a water vapor or air based curing adhesive.

In one embodiment, a single removable cellophane or plastic cover or protective film may protect both the pre-applied strain sensor adhesive and the exposed side of the adhesive. FIG. 17 is a cross section through one example adhesive strain sensing pod 1700, prior to installation of adhesive strain sensing pod 1700 on a structural element 1750 and using a sensor adhesive 1712 that is cured by one or both of water vapor and/or air. For example, there is sufficient air and/or water vapor within the lower portion of the adhesive strain sensing pod 1700 and/or on a prepared surface 1752 of structural element 1750, to trigger curing of the adhesive. Adhesive strain sensing pod 1700 has a semi-rigid protective case 1702 that forms an upper region 1706 separated from a lower region 1707 by an internal wall 1703. In certain embodiments, internal wall 1703 may be a membrane. In certain other embodiments, internal wall 1703 may be formed by electronics 1704. Upper region 1706 includes electronics 1704 and an energy store 1708 that may be accessible (e.g., replaceable) through a cap 1710 when energy store 1708 is implemented as a replaceable battery. Lower region 1707 includes a pressure pad 1714, a strain sensor 1718, and water vapor or air activated sensor adhesive 1712. A housing adhesive 1722 (e.g., double-sided tape) is attached to a lower edge 1715 of protective case 1702. A protective film 1730 covers housing adhesive 1722 and sensor adhesive 1712 to keep water vapor and/or air away from sensor adhesive 1712 to prevent activation before adhesive strain sensing pod 1700 is installed. Protective film 1730 is removed prior to installation of adhesive strain sensing pod 1700 (e.g., once prepared surface 1752 is ready to receive adhesive strain sensing pod 1700). In this embodiment, sensor adhesive 1712 is pre-applied to bottom surface 1724 of strain sensor 1718 in a quantity sufficient for adhesion of strain sensor 1718 to prepared surface 1752; however, sensor adhesive 1712 may not completely fill lower region 1707. For example, sensor adhesive 1712 may be applied to strain sensor 1718 in a controlled environment (e.g., free from reactive agents, such as water vapor and certain gasses) and then sealed by protective film 1730.

Pressure pad 1714 may be securely adhered, or otherwise attached (e.g., slots, membranes, protrusions, etc.) to a lower surface of internal wall 1703 of protective case 1702 such that pressure pad 1714 is retained with protective case 1702. Strain sensor 1718 may be attached to pressure pad 1714 (or protective case 1702 when pressure pad 1714 is omitted) such that strain sensor 1718 is retained within protective case 1702 prior to installation. For example, a light strength glue or double-sided tape (not shown) may adhere an upper surface of strain sensor 1718 to a lower surface of pressure pad 1714. Accordingly, the coupling between strain sensor 1718 and pressure pad 1714 is weaker than the coupling between pressure pad 1714 and protective case 1702, such that pressure pad 1714 does not interfere with sensing of strain sensor 1718. Advantageously, as described above, orientation of strain sensor 1718 with respect to protective case 1702 is maintained prior to installation of adhesive strain sensing pod 1700, thereby allowing strain sensor 1718 to be positioned by alignment marks, shape, etc., of protective case 1702.

In one example of installation, once prepared surface 1752 is ready to receive adhesive strain sensing pod 1700, protective film 1730 is removed, triggering activation of sensor adhesive 1712 by water vapor and/or gasses in ambient air. In certain embodiments, additional steps to activate sensor adhesive 1712 may be included. Adhesive strain sensing pod 1700 is then positioned on structural element 1750 and a clamp force (e.g., similar to clamp force 1102 of FIG. 11) is applied such that adhesive strain sensing pod 1700 and structural element 1750 are pressed together. As protective case 1702 is forced towards prepared surface 1752, housing adhesive 1722 may compress and pressure pad 1714 pushes strain sensor 1718 into prepared surface 1752. Housing adhesive 1722 seals edges of protective case 1702 against prepared surface 1752, thereby preventing excess sensor adhesive 1712 from escaping from lower region 1707. While the clamp force is applied, protective case 1702, and particularly internal wall 1703, causes pressure pad 1714 to press strain sensor 1718 against prepared surface 1752, squeezing excess sensor adhesive 1712 from between surfaces 1724 and 1752 and ensuring good adhesion of strain sensor 1718 to structural element 1750. Once sensor adhesive 1712 is set, the clamp force may be removed, and sensor adhesive 1712 retains adhesive strain sensing pod 1700 on structural element 1750.

Power and Recharging

A pod (e.g., any adhesive strain sensing pod disclosed herein) may include an energy store (e.g., a battery) or it may be plugged into a power supply. Alternatively, the pod may be powered through energy harvesting (e.g., solar collector, inductive collector, thermal collector, mechanical motion conversion, and radio frequency collector). Where the energy store is a battery, the battery may be a primary cell (disposable) or a secondary cell (rechargeable). An example of a primary cell includes a coin-cell battery, and would be replaced when depleted. Alternatively, batteries utilizing alkaline or lithium ferro phosphate chemistries come in a variety of sizes (e.g., larger capacity) and may be used depending on the battery life required and the environmental conditions.

In certain embodiments, a wired power supply may be more advantageous under certain conditions. For example, the power supply may be plugged into the mains. Alternatively, the power supply may be plugged into a power supply of a transportation vehicle, or the power supply may be plugged into a generator or large rechargeable power supply. A surface contact power source could be used on a conductive surface. In certain embodiments, the pod may receive power over an ethernet connection (e.g., POE).

In certain embodiments, the pod may implement energy harvesting to gather energy from its surrounding environment. Examples of energy harvesting include solar power, and piezoelectric to capture energy from certain types of motion, including, but not limited to vibration and tension/compression/torsion. The pod may also be configured to capture energy from rotating or translating magnets. The pod may also implement one or both of thermal and radio frequency energy harvesting.

Figure 18:
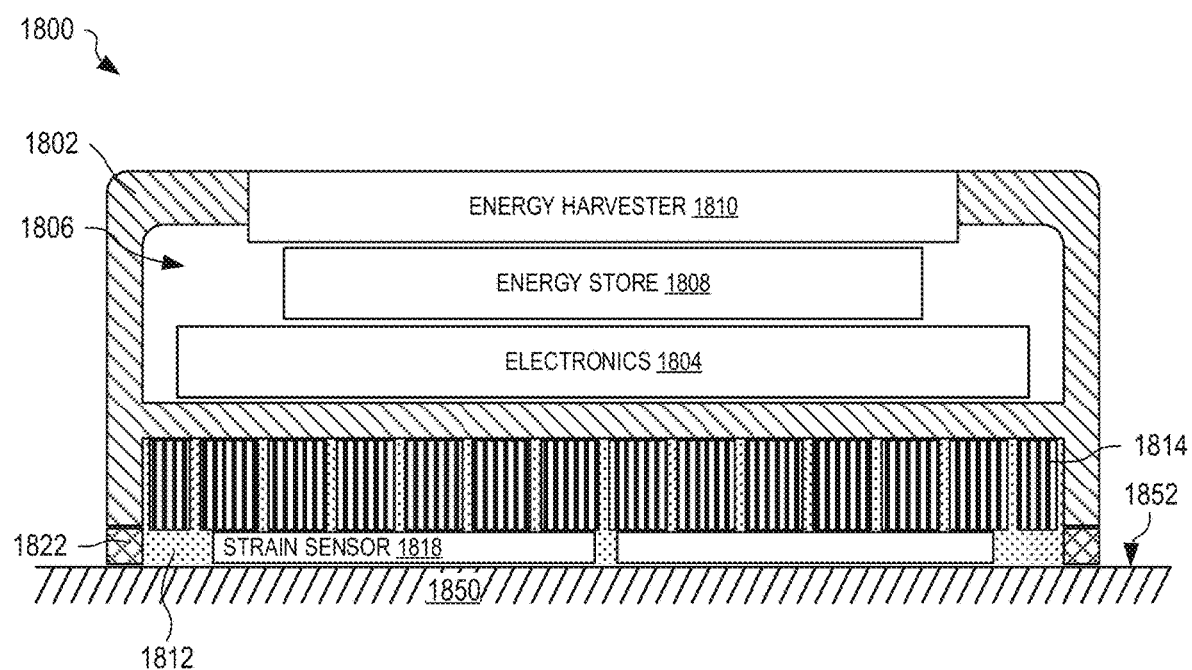
FIG. 18 is a cross section through one example adhesive strain sensing pod with an energy harvester, in an embodiment.

FIG. 18 is a cross section through one example adhesive strain sensing pod 1800 with an energy harvester 1810. Adhesive strain sensing pod 1800 is similar to adhesive strain sensing pod 1000 of FIG. 10, and includes a housing 1802 forming an upper region 1806 that encloses electronics 1804, an energy store 1808 (e.g., a rechargeable battery), and a lower region that includes at least one strain sensor 1818, a pressure pad 1814, and a housing adhesive 1822. The at least one strain sensor 1818 is pressed against a prepared surface 1852 of a structural element 1850 by a pressure pad 1814 and secured by a sensor adhesive 1812. Adhesive strain sensing pod 1800 may be attached to structural element 1850 using any of the methods described above.

Energy harvester 1810 is shown positioned at a top surface of housing 1802, but may be positioned elsewhere without departing from the scope hereof. Energy harvester 1810 may include one or more of a solar collector, an inductive collector, a thermal collector, and a radio frequency collector. Electronics 1804 may include appropriate circuitry that cooperates with energy harvester 1810 to charge energy store 1808 and/or power electronics 1804.

The pod may also include a secondary (rechargeable) battery that stores electrical energy and provides power to operate the pod. The chemistry of the secondary battery may include one or more of lithium ion, nickel cadmium, metal hydride, lead-acid or other applicable types of secondary battery. To recharge the secondary battery, the pod may implement one or more of contacts to receive power from a power supply connected to a grid based (mains) electrical power source, conductive charging, energy harvesting, and circuitry to receive power from other external (and typically larger) battery.

Figure 19:
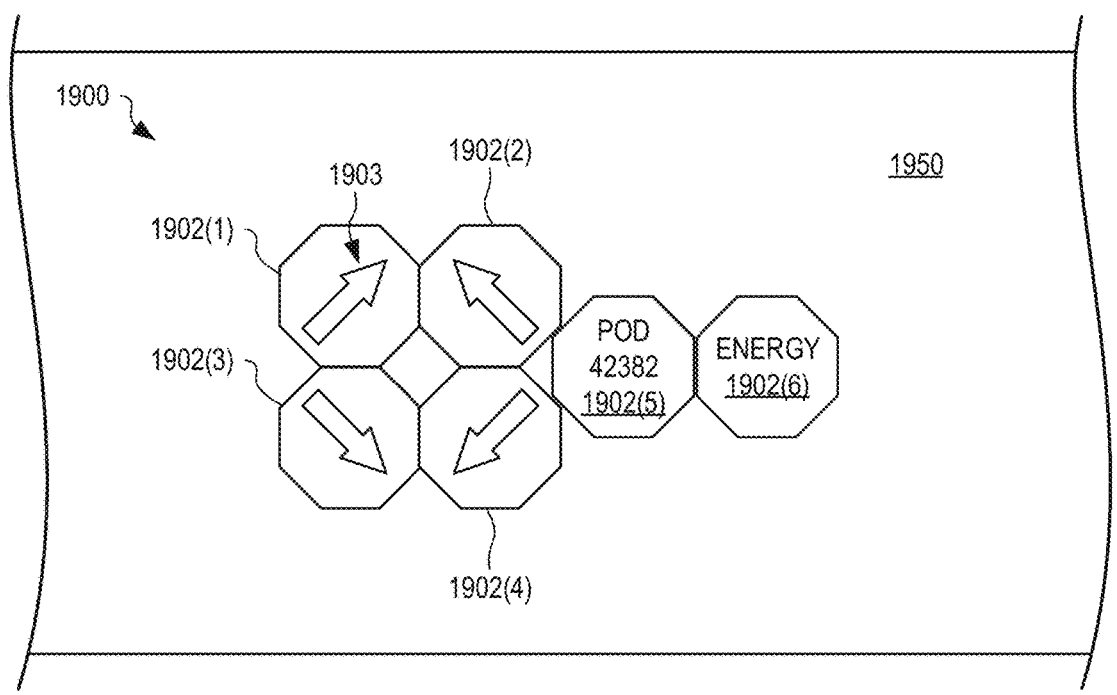
FIG. 19 is a schematic illustrating a plurality of housings positioned on a structural element to form an adhesive strain sensing pod to sense strain of structural element, in an embodiment.

FIG. 19 is a schematic illustrating a plurality of housings 1902(1)-(6) positioned on a structural element 1950 to form an adhesive strain sensing pod 1900 to sense strain of structural element 1950. In certain embodiments, housings 1902(1)-(4) each contain at least one strain sensor, where an indicator 1903 on each of housings 1902(1)-(4) indicates orientation of the strain sensor within that housing (e.g., also see FIGS. 5A-5C and 6). Housing 1902(5) includes electronics (e.g., similar to any one of electronics 1004, 1304, 1404, 1504, 1604, 1704, and 1804 of FIGS. 10-12, 13, 14, 15, 16, 17 and 18, respectively) and housing 1902(6) includes an energy store, such as one or more batteries (similar to energy stores 1008, 1308, 1408, 1508, 1608, 1708, and 1808 of FIGS. 10-12, 13, 14, 15, 16, 17 and 18, respectively) and/or at least one energy harvester (e.g., similar to energy harvester 1810 of FIG. 18). Housings 1902(1)-(6) cooperate to form adhesive strain sensing pod 1900. For example, adjacent portions of housings 1902(1)-(6) may snap together to provide electrical connectivity through contacts positioned at edge of the housings. In another example, three housings 1902(4), 1902(5) and 1902(6) may snap together to form adhesive strain sensing pod 1900, where housing 1902(4) contains one or more strain sensors, housing 1902(5) contains electronics (e.g., processor and signal conditioning circuitry), and housing 1902(6) contains an energy store.

Figure 20:
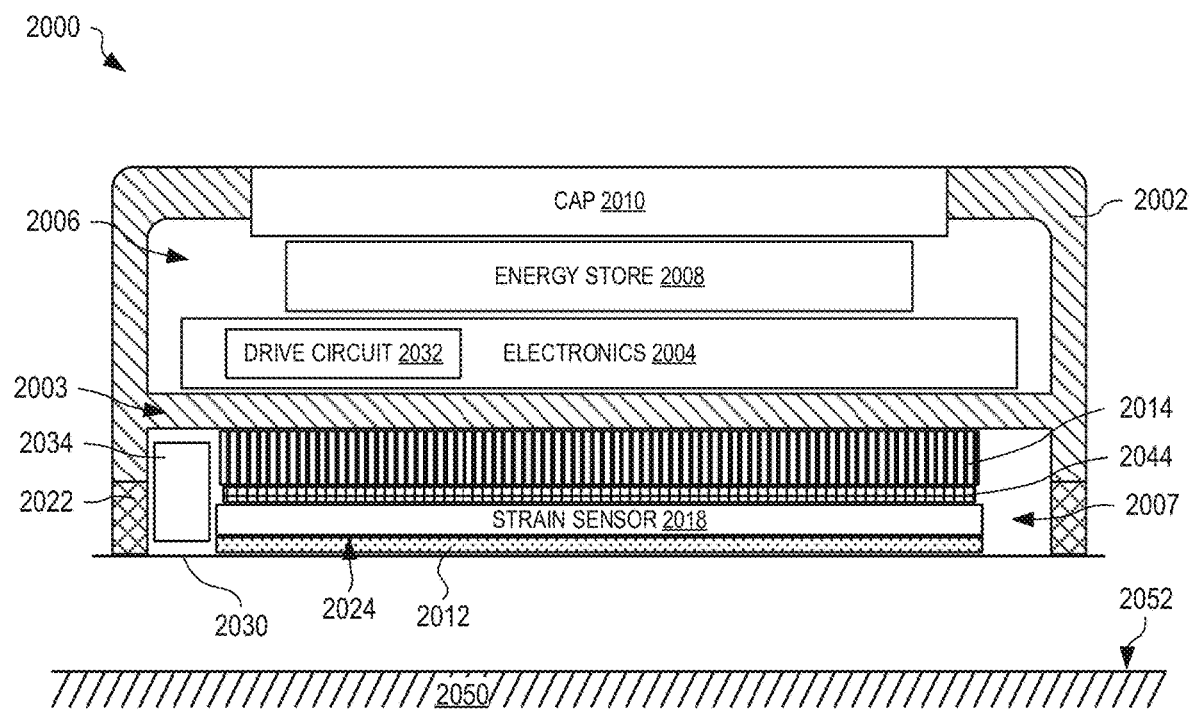
FIG. 20 is a cross section through one example adhesive strain sensing pod, prior to installation, that is similar to the adhesive strain sensing pod of FIG. 13, but includes a thermally activated adhesive film, in an embodiment.

FIG. 20 is a cross section through one example adhesive strain sensing pod 2000, prior to installation, that is similar to adhesive strain sensing pod 1300 of FIG. 13, but includes a thermally activated adhesive film 2012 (e.g., a sensor adhesive that is one of an epoxy, a dry-film glue, or other, as discussed below). Adhesive strain sensing pod 2000 includes a semi-rigid protective case 2002 that forms an upper region 2006 and a lower region 2007 separated by an internal wall 2003. In certain embodiments, internal wall 2003 may be a membrane. In certain other embodiments, internal wall 2003 may be formed by electronics 2004. Upper region 2006 includes electronics 2004 and an energy store 2008 (e.g., a battery) that may be accessible through a cap 2010. Lower region 2007 includes a pressure pad 2014, a strain sensor 2018, and a trigger mechanism 2034 (e.g., see also trigger circuit 2940 of FIG. 29). A housing adhesive 2022, (e.g., a double-sided tape) similar to housing adhesive 1022 of FIG. 10, is applied to a lower edge of protective case 2002. Thermally activated adhesive film 2012 is applied to a lower strain sensor surface 2024 of strain sensor 2018. Housing adhesive 2022 and thermally activated adhesive film 2012 are covered by a removable protective film 2030. Removable protective film 2030 prevents contamination of an external surface of housing adhesive 2022 and an external surface of thermally activated adhesive film 2012, and prevents inadvertent adhesion of thermally activated adhesive film 2012 and housing adhesive 2022 to other objects prior to installation of adhesive strain sensing pod 2000. In certain embodiments, lower region 2007 may also include a trigger mechanism 2034 that triggers a drive circuit 2032 of electronics 2004 to drive a current through at least one strain sensor 2018 and/or secondary electric heating element 2044 (e.g., see also electric heating element 2944 of FIG. 29) to heat thermally activated adhesive film 2012 to a curing temperature for a defined period to prepare the strain sensor to adhere to the structural surface when protective film 2030 is removed. In other embodiments, drive circuit 2032 is triggered by other means, such as by one or more of: wireless commands, kinetic commands (e.g., tapping adhesive strain sensing pod 2000), and so on. In yet other embodiments, trigger mechanism 2034 includes one or more of a pressure sensor, a proximity sensor, a light sensor, and so on, that may be used to detect when adhesive strain sensing pod 2000 is being applied to a structural element and to activate drive circuit 2032 after a predefined delay (e.g., to allow time for positioning of adhesive strain sensing pod 2000).

In another embodiment, drive circuit 2032 is external to adhesive strain sensing pod 2000 and electrically connects via at least two electrical contacts (or other electric transfer such as through inductive coupling) on protective case 2002. During installation of adhesive strain sensing pod 2000, external drive circuit 2032 may be connected to the at least two electrical contacts to activate thermally activated adhesive film 2012. Drive circuit 2032 may also use power from a power source external to adhesive strain sensing pod 2000. Drive circuit 2032 may be controlled by a PID controller where the controller measures the resistance of heating element 2044 or the output of a thermistor or similar device to bring the film to the correct temperature and then holds that temperature for a specified period. Alternatively, the entire substrate, or portions thereof, may be brought up to the desired temperature by applying external heating, such as by using an oven or chemical hot pack.

Pressure pad 2014 may be securely adhered, or otherwise attached (e.g., slots, membranes, etc.) to a lower surface of protective case 2002 such that pressure pad 2014 is retained with protective case 2002. Strain sensor 2018 may be attached to pressure pad 2014 (or protective case 2002 when pressure pad 2014 is omitted) such that strain sensor 2018 is retained within protective case 2002 prior to installation. For example, a light strength glue or double-sided tape (not shown) may adhere an upper surface of strain sensor 2018 to a lower surface of pressure pad 2014. Accordingly, the coupling between strain sensor 2018 and pressure pad 2014 is weaker than the coupling between pressure pad 2014 and protective case 2002. Advantageously, as described above, orientation of strain sensor 2018 with respect to protective case 2002 is maintained prior to installation of adhesive strain sensing pod 2000.

To install adhesive strain sensing pod 2000, once prepared surface 2052 is ready to receive adhesive strain sensing pod 2000, protective film 2030 is removed from thermally activated adhesive film 2012 and housing adhesive 2022, and adhesive strain sensing pod 2000 is positioned on structural element 1350. A clamp force (e.g., clamp force 1102 or other similar force) is then applied such that adhesive strain sensing pod 2000 and structural element 2050 are pressed together. Housing adhesive 2022 adheres edges of protective case 2002 to surface 2052. While the clamp force is applied to protective case 2002, internal wall 2003 causes pressure pad 2014 to press strain sensor 2018 against prepared surface 2052, thereby ensuring good adhesion of strain sensor 2018 to structural element 2050. In certain embodiments, when activated by trigger mechanism 2034 or by other signals or actions, drive circuit 2032 causes at least one strain sensor and/or secondary electric element to generate heat, using power from energy store 2008, for a predefined heating period that is long enough to causes thermally activated adhesive film 2012 to melt, thereby adhering strain sensor 2018 to structural element 2050. In other embodiments, drive circuit 2032 and trigger mechanism 2034 are omitted and structural element 2050 may be heated to initiate the thermally activated adhesive film 2012. Once thermally activated adhesive film 2012 has set, the clamp force may be removed, and thermally activated adhesive film 2012 and housing adhesive 2022 retains adhesive strain sensing pod 2000 on structural element 2050.

In certain embodiments, adhesive strain sensing pod 2000 may include the secondary electric heating element 2044 (see also heating element 2944 of FIG. 29) between strain sensor 2018 and electronics 2004 (e.g., within one or more of pressure pad 2014, internal wall 2003, and on electronics 2004) to raise thermally activated adhesive film 2012 to its activation temperature for the required period.

Thermally Activated Adhesives

One aspect of the embodiments described herein includes a method of bonding a substrate of the strain sensor (e.g., a strain-gauge) to the surface of the structural element using a thermally activated adhesive film (e.g., thermally activated adhesive film 2012 of FIG. 20). The thermally activated adhesive film may be heated by a heating element (e.g., heating element 2044) that is an electrically conductive structure such as a metal foil placed on or near the surface of the structural element to be bonded. The bonding temperature of the thermally activated film may also be achieved using external equipment such as an infrared gun or an inductive heater. In such embodiments, heating element 2044 is omitted. One advantage of using thermally activated films is that they are easily assembled in an adhesive strain sensing pod during manufacturing and cured at a later time, permitting the sensor to be conveniently bonded to the surface of the structural element on site.

The thermally activated adhesive may be one of any known thermoplastic adhesives (e.g., hotmelt adhesives) or thermosetting adhesives (e.g., reactive adhesives). In certain embodiments, a hybrid adhesive that belongs in both categories (e.g., reactive and hotmelt adhesives) may be used to bond the sensor to the surface.

Suitable thermally activated adhesives include, but are not limited to the ones described in The Handbook of Adhesives and Sealants, 2nd Edition (Chapters 13 to 15) and in EP1956063A2. Preferred adhesives are selected from the group of polyamides, polycarbonates, polyethylene vinyl acetates, polyethylenes, polypropylenes, polyesters, epoxy resins, polyurethanes and polyurea adhesives, nitrile-butadiene rubbers, polyacrylates, phenolic resins and silicones. Preferred thermally activated adhesives are solid in the non-activated state.

In certain embodiments, a thermally activated adhesive film may be formed on the strain sensor by coating the substrate of the strain sensor with a heat activated, latently reactive adhesive in liquid or paste form and drying the composition to form the film on the strain sensor.

In certain embodiments, the thermally activated adhesive film may be pre-tacked to the strain sensor at room temperature or at the pre-bonding temperature. In other embodiments, the thermally activated adhesive may be stabilized at the strain sensor by clamping or interposing it in the adhesive strain sensing pod, and partially tacking or gluing it.

In certain embodiments, to facilitate heat transfer in the adhesive film, the thermally activated adhesive film may be selected from the group of thermo conductive adhesives. For example, thermally conductive fillers may be added to any of the thermally activated adhesives cited above. In certain embodiments, a combination of different thermally activated films may be used in successive layers, for example.

Heating Element

In certain embodiments, the thermally activated adhesive film may be heated by a heating element (e.g., heating element 2044) placed directly on, or in the vicinity of, the surface to be bonded. The heating element may be an electrically conductive structure, such as metal or graphite, that converts electrical energy into thermal energy, and may be designed in any shape required by the bonding geometry, as a thin sheet, mesh, foil, and a perforated or undulating structure. For ease of handling, the electrically conductive structure may be embedded in a non-conductive material, such as, but not limited to, one or more of polyimide, polyethylene terephthalate, and silicon.

In certain embodiments, the device used for recording the stimuli in the sensor (such as strain, acceleration, or temperature) may also function as a heating element.

The heating element may be positioned at, or near, the area to be bonded. For example, the heating element may be attached to the structural element, or included with the adhesive strain sensing pod. In a preferred embodiment, the heating element is positioned on top of the strain sensor in a construct where the strain sensor is sandwiched between the heating element and the thermally activated adhesive film.

A thermal isolation may be included within the adhesive strain sensing pod and/or on the structural element to facilitate heat distribution in the bonding area and/or to protect the installer.

In another embodiment, the thermally activated adhesives may be cured inductively with the aid of an electric field, magnetic field, electromagnetic field, electric alternating field, magnetic alternating field, and/or electromagnetic alternating field. The energy may also be generated through IR or circulation of hot air.

Figure 21:
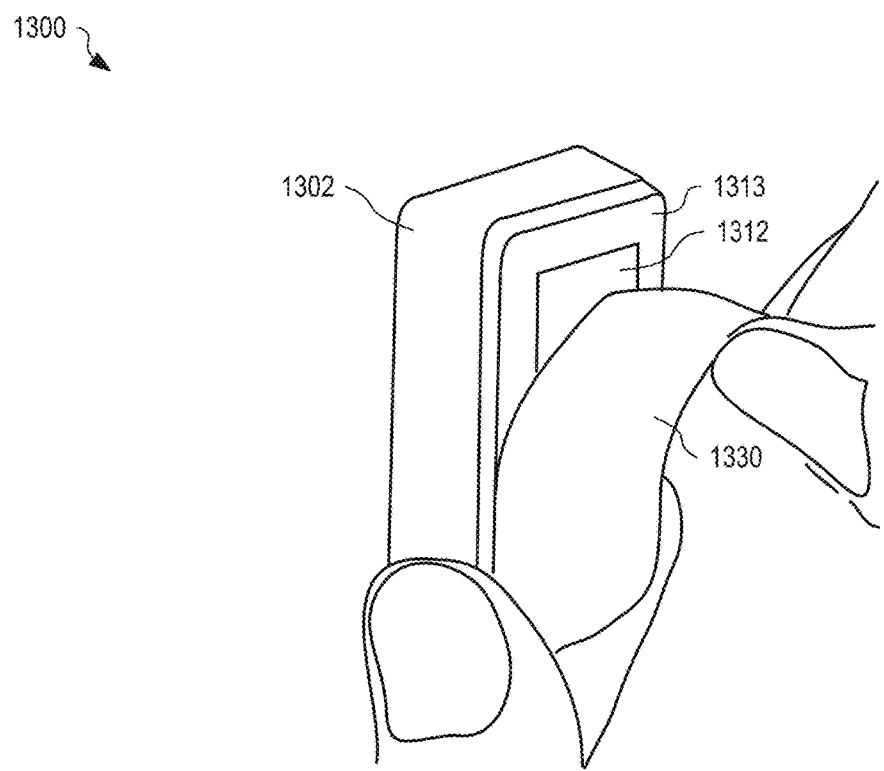
FIG. 21 is a perspective view showing the protective film being peeled from the adhesive strain sensing pod of FIG. 13 prior to installation of the adhesive strain sensing pod, in an embodiment.

FIG. 21 is a perspective view showing protective film 1330, partially removed (e.g., being peeled) from adhesive strain sensing pod 1300 prior to installation of adhesive strain sensing pod 1300 onto a prepared structural element (not shown). As protective film 1330 is removed, housing adhesive 1313 and sensor adhesive 1312 are revealed. Prior to embodiments described herein, attaching one or more strain sensors to the surface of the structural element at a correct location and with a correct orientation, and particularly with correct adhesion, was a specialized process that required a specialist with specialist tools. However, the adhesive strain sensing pods described herein allow a consumer to successfully install one or more strain sensors to a prepared surface of a structural element. Advantageously, the use of adhesive strain sensing pods makes attaching and aligning of strain sensor components on a structural element much simpler such that a third party may successfully attach an adhesive strain sensing pod to existing equipment and structures.

Figure 22:
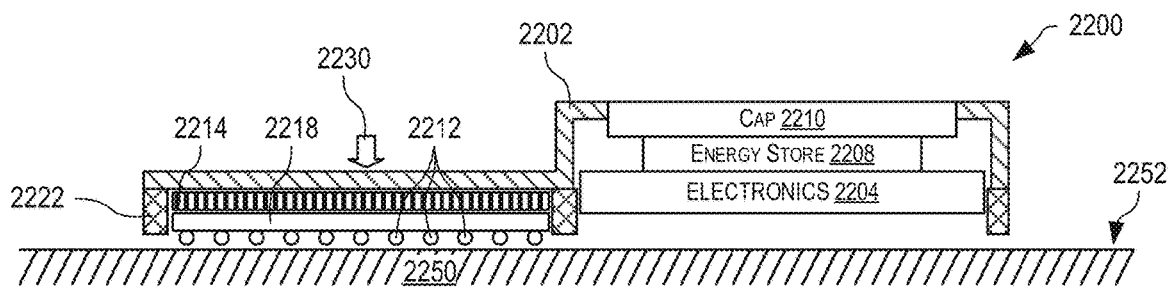
FIG. 22 shows one example adhesive strain sensing pod with adhesive beads, prior to attachment to a surface of a structural element, in an embodiment.

FIG. 22 shows one example adhesive strain sensing pod 2200 with adhesive beads 2212, prior to attachment to a surface 2252 of a structural element 2250. Adhesive strain sensing pod 2200 is similar to adhesive strain sensing pod 300 of FIG. 3, and includes a protective case 2202, electronics 2204, an energy store 2208 (e.g., a battery) accessible via a cap 2210, a pressure pad 2214, a strain sensor 2218, and housing adhesive 2222 (e.g., double sided tape). Adhesive beads 2212 encapsulate an adhesive for adhering strain sensor 2218 to surface 2252. Adhesive beads 2212 may be distributed across a bottom surface of strain sensor 2218 and may be protected by a protective film (e.g., similar to protective film 1230 of FIG. 12) that is removed prior to applying adhesive strain sensing pod 2200 to surface 2252.

During installation, adhesive strain sensing pod 2200 is removed from any packaging, the protective file is removed, and adhesive strain sensing pod 2200 is positioned onto surface 2252. A force 2230 is applied (e.g., by a physical clamp, vacuum of the pod housing so atmospheric pressure then applies the pressure, magnetic, etc.) to protective case 2202 proximate strain sensor 2218 to force strain sensor 2218, via pressure pad 2214, against surface 2252 such that adhesive beads 2212 rupture, releasing the adhesive between strain sensor 2218 and surface 2252. The adhesive then cures to adhere strain sensor 2218 to surface 2252. Housing adhesive 2222 adheres protective case 2202 to surface 2252. In certain embodiments, pressure pad 2214 may be omitted and protective case 2202 is shaped and sized to transfer externally applied force to strain sensor 2218.

Pressure pad 2214 may be securely adhered, or otherwise attached (e.g., slots, membranes, protrusions, etc.) to a lower surface of protective case 2202 such that pressure pad 2214 is retained with protective case 2202. Strain sensor 2218 may be attached to pressure pad 2214 (or protective case 2202 when pressure pad 2214 is omitted) such that strain sensor 2218 is retained within protective case 2202 prior to installation. For example, a light strength glue or double-sided tape (not shown) may adhere an upper surface of strain sensor 2218 to a lower surface of pressure pad 2214. Accordingly, the coupling between strain sensor 2218 and pressure pad 2214 is weaker than the coupling between pressure pad 2214 and protective case 2202, so that strain sensor 2218, once adhered to surface 2252, may separate from pressure pad 2214, which remains attached to protective case 2202. Advantageously, as described above, orientation of strain sensor 2218 with respect to protective case 2202 is maintained prior to installation of adhesive strain sensing pod 2200 such that markings and/or shape of protective case 2202 may be used to align strain sensor 2218 with structural element 2250.

Figure 23:
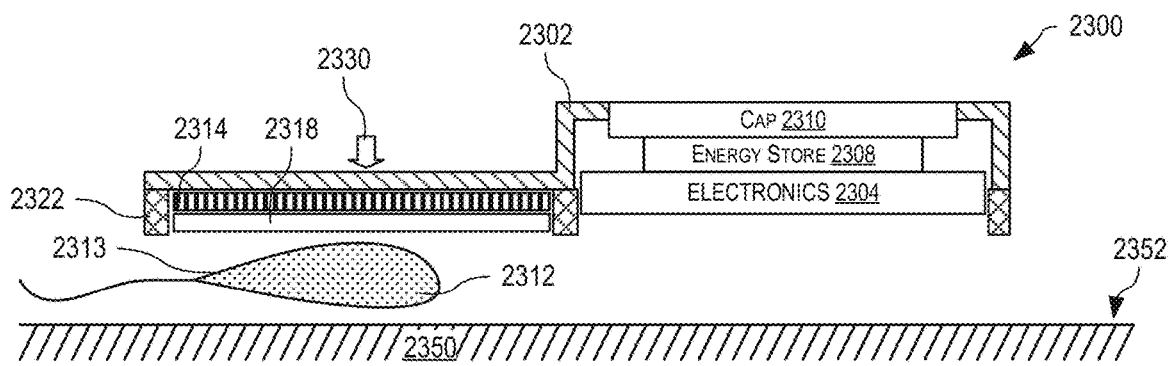
FIGS. 23 and 24 show installation of an adhesive strain sensing pod onto a surface of a structural element using a fluid adhesive contained within a fragile pouch, in an embodiment.
Figure 24:
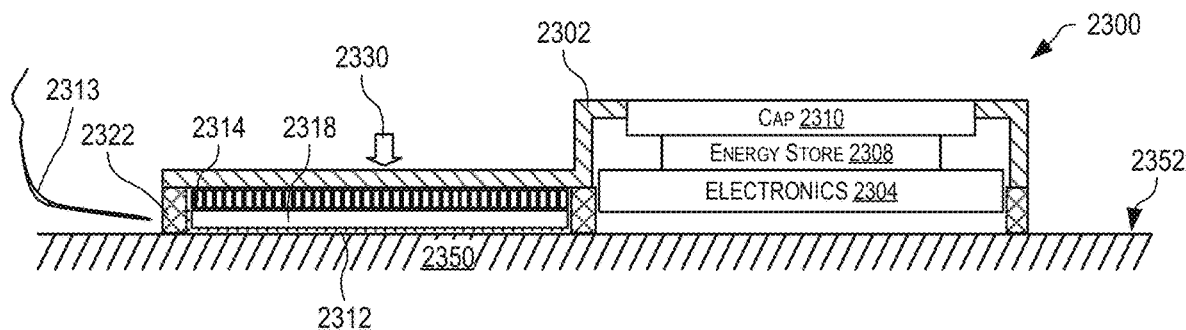

FIGS. 23 and 24 show installation of an adhesive strain sensing pod 2300, similar to adhesive strain sensing pod 300 of FIG. 3, onto a surface 2352 of a structural element 2350 using a fluid adhesive 2312 contained within a fragile pouch 2313. Adhesive strain sensing pod 2300 includes a protective case 2302, electronics 2304, an energy store 2308 (e.g., a battery) accessible via a cap 2310, a pressure pad 2314, a strain sensor 2318, and housing adhesive 2322 (e.g., double sided tape).

Fragile pouch 2313 containing fluid adhesive 2312 is positioned beneath strain sensor 2318, as shown in FIG. 23, and adhesive strain sensing pod 2300 is positioned over and pressed down onto surface 2352 such that fragile pouch 2313 ruptures, releasing fluid adhesive 2312 between strain sensor 2318 and surface 2352. As shown in FIG. 24, fragile pouch 2313 may be removed, once fluid adhesive 2312 is released, and force 2330 applied to protective case 2302, proximate strain sensor 2318, until adhesive 2312 has cured and strain sensor 2318 is adhered to surface 2352. Protective case 2302 is adhered to surface 2352 by housing adhesive 2322, which may also reduce escape of fluid adhesive 2312. In certain embodiments, pressure pad 2314 may be omitted and protective case 2302 is shaped and sized to transfer externally applied forces to strain sensor 2318.

Pressure pad 2314 may be securely adhered, or otherwise attached (e.g., slots, membranes, protrusions, etc.) to a lower surface of protective case 2302 such that pressure pad 2314 is retained with protective case 2302. Strain sensor 2318 may be attached to pressure pad 2314 (or protective case 2302 when pressure pad 2314 is omitted) such that strain sensor 2318 is retained within protective case 2302 prior to installation. For example, a light strength glue or double-sided tape (not shown) may adhere an upper surface of strain sensor 2318 to a lower surface of pressure pad 2314. Accordingly, the coupling between strain sensor 2318 and pressure pad 2314 is weaker than the coupling between pressure pad 2314 and protective case 2302 such that strain sensor 2318 may separate from pressure pad 2314 once adhered to structural element 2350. Advantageously, as described above, orientation of strain sensor 2318 with respect to protective case 2302 is maintained prior to installation of adhesive strain sensing pod 2300 such that alignment of markings and/or shape of protective case 2302 may be used to align strain sensor 2318 with structural element 2350.

Figure 25:
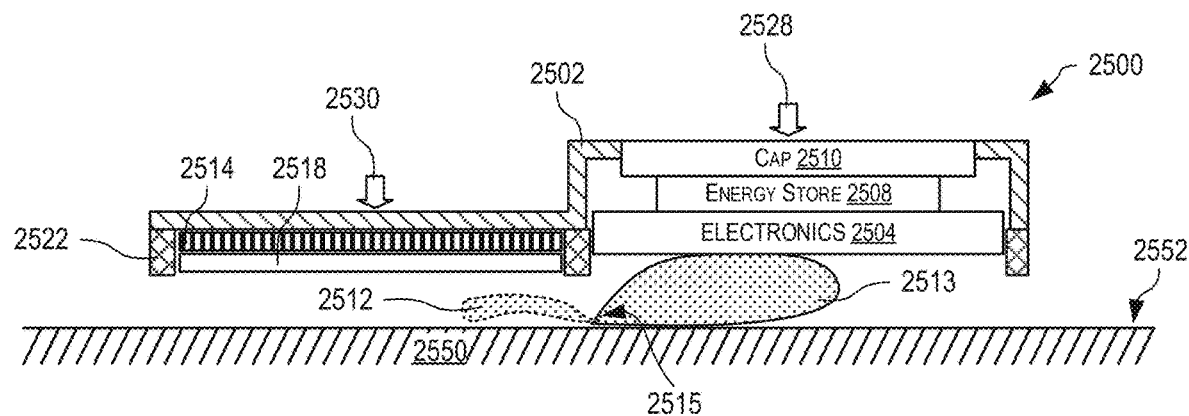
FIGS. 25 and 26 show installation of an adhesive strain sensing pod onto a surface of a structural element using a fluid adhesive contained within a fragile pouch, in an embodiment.
Figure 26:
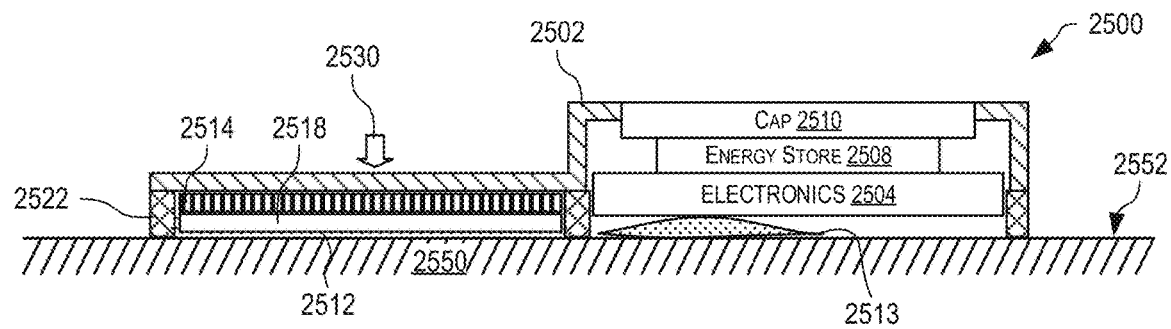

FIGS. 25 and 26 show installation of an adhesive strain sensing pod 2500, similar to adhesive strain sensing pod 300 of FIG. 3, onto a surface 2552 of a structural element 2550 using a fluid adhesive 2512 contained within a fragile pouch 2513. Adhesive strain sensing pod 2500 includes a protective case 2502, electronics 2504, a battery 2508 accessible via a cap 2510, a pressure pad 2514, a strain sensor 2518, and housing adhesive 2522 (e.g., double sided tape).

Fragile pouch 2513 is positioned adjacent to strain sensor 2518 and beneath electronics 2504 (or structure of protective case 2502 if so configured) as shown in FIG. 25, and adhesive strain sensing pod 2500 is positioned over and pressed (e.g., as indicated by force 2528) onto surface 2552 such that fragile pouch 2513 ruptures, releasing fluid adhesive 2512 between strain sensor 2518 and surface 2552. Fragile pouch 2513 may include a weak-portion 2515, positioned to face strain sensor 2518, that ruptures when force 2528 is applied to protective case 2502 to eject fluid adhesive 2512 beneath strain sensor 2518 as shown. Fragile pouch 2513 remains beneath protective case 2502, as shown in FIG. 26, but does not interfere with adhesion of strain sensor 2518 to surface 2552 when force 2530 is applied to protective case 2502, proximate strain sensor 2518, until adhesive 2512 has cured. In certain embodiments, pressure pad 2514 may be omitted and protective case 2502 is shaped and sized to transfer externally applied force 2530 to strain sensor 2518.

Pressure pad 2514 may be securely adhered, or otherwise attached (e.g., slots, membranes, protrusions, etc.) to a lower surface of protective case 2502 such that pressure pad 2514 is retained with protective case 2502. Strain sensor 2518 may be attached to pressure pad 2514 (or protective case 2502 when pressure pad 2514 is omitted) such that strain sensor 2518 is retained within protective case 2502 prior to installation. For example, a light strength glue or double-sided tape (not shown) may adhere an upper surface of strain sensor 2518 to a lower surface of pressure pad 2514. Accordingly, the coupling between strain sensor 2518 and pressure pad 2514 is weaker than the coupling between pressure pad 2514 and protective case 2502, such that strain sensor 2518 may separate from pressure pad 2514 once adhered to structural element 2550. Advantageously, as described above, orientation of strain sensor 2518 with respect to protective case 2502 is maintained prior to installation of adhesive strain sensing pod 2500 such that strain sensor 2518 may be aligned with structural element 2550 by aligning markings and/or shape of protective case 2502.

Figure 27:
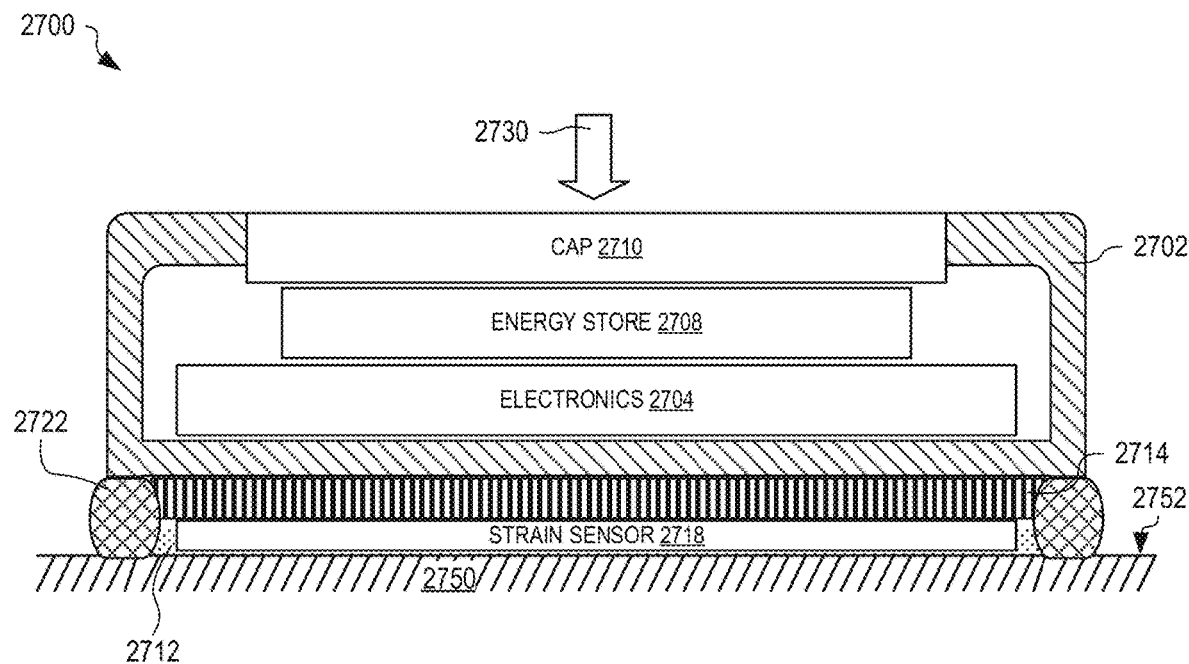
FIGS. 27 and 28 show one example adhesive strain sensing pod during and after installation on a structural element, in an embodiment.
Figure 28:
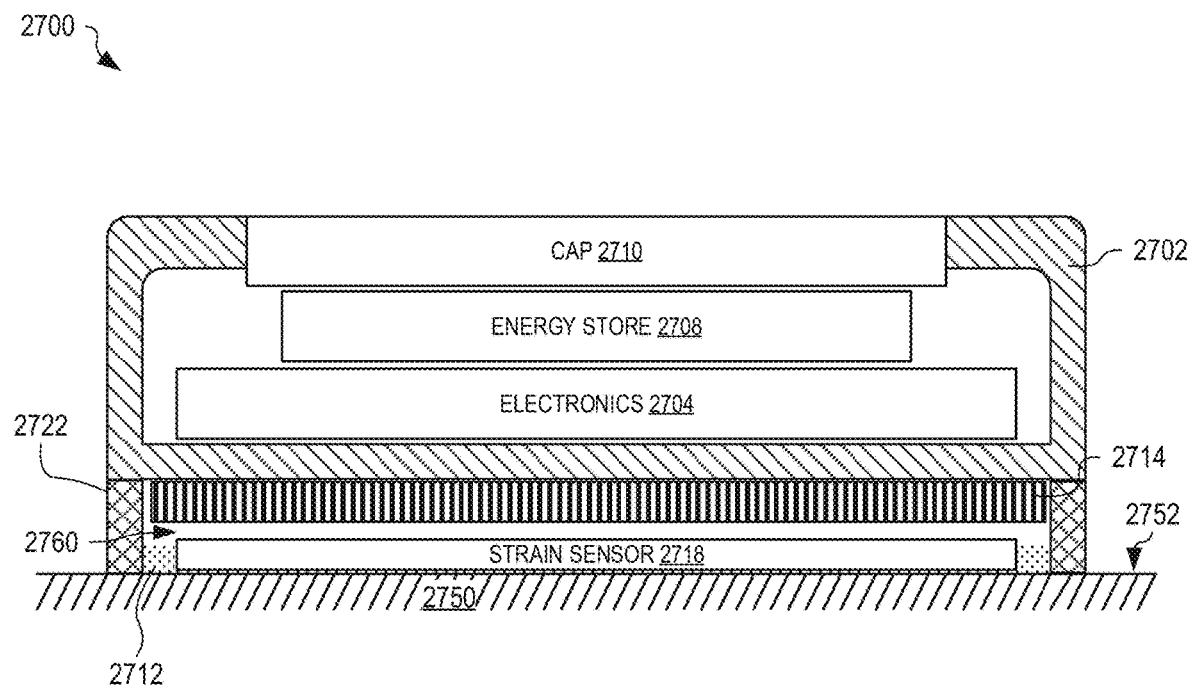

FIGS. 27 and 28 show one example adhesive strain sensing pod 2700 during and after installation on a structural element 2750. In FIG. 27, a force 2730 is applied to a protective case 2702 of adhesive strain sensing pod 2700 while adhesive 2712 cures and adheres strain sensor 2718 to a surface 2752 of structural element 2750. Adhesive strain sensing pod 2700 may represent any of the adhesive strain sensing pods described herein (e.g., any of pods 100, 200, 300, 400, 500, 600, 700, 800, 900, 1000, 1200, 1300, 1400, 1500, 1600, 1700, 1800, 1900, 2000, 2200, 2300, 2500, and 2700) where a pressure pad 2714 applies pressure to strain sensor 2718 while adhesive 2712 cures. Adhesive strain sensing pod 2700 may include electronics 2704 and an energy store 2708 that is accessible via a cap 2710.

Prior to installation, strain sensor 2718 may be attached to pressure pad 2714 by a light (weak) adhesive (e.g., a double-sided tape, light glue etc., not shown) to retain strain sensor 2718 within adhesive strain sensing pod 2700. Advantageously, prior to installation of adhesive strain sensing pod 2700, this light glue maintains orientation of strain sensor 2718 with respect to protective case 2702, thereby allowing a user to place strain sensor 2718 correctly onto surface 2752 by correctly aligning a marking and/or shape of protective case 2702 with respect to structural element 2750. Other types of attachment (e.g., membranes, filaments, protrusions, etc.) may be used to retain strain sensor 2718 with protective case 2702 and/or pressure pad 2714 without departing from the scope hereof.

As shown in FIG. 27, during installation, force 2730 (e.g., as applied by a clamp or other means) presses protective casing 2702 towards surface 2752 and a housing adhesive 2722 (e.g., double sided tape) compresses and/or deforms such that pressure pad 2714 transfers at least part of force 2730 to press strain sensor 2718 onto surface 2752 while adhesive 2712 cures or sets.

Once adhesive 2712 has cured or set, force 2730 is removed, and as shown in FIG. 28, housing adhesive 2722 may return to a non-compressed state. Pressure pad 2714 is attached more securely to a lower surface of protective case 2702 than to strain sensor 2718, and therefore, as housing adhesive 2722 decompresses, pressure pad 2714 detaches from strain sensor 2718 to leave a small gap 2760 between pressure pad 2714 and strain sensor 2718. Advantageously, strain sensor 2718 remains adhered to surface 2752 and pressure pad 2714 does not interfere with sensed measurements made by strain sensor 2718. However, pressure pad 2714 is very compliant, as compared to a substrate of strain sensor 2718, and therefore even when pressure pad 2714 remains attached to strain sensor 2718, interference from pressure pad 2714 on strain sensor measurements is minimal.

In certain embodiments, an upper surface (facing pressure pad 2714) of strain sensor 2718 may have a low adhesion, or may be coated with a low adhesion material (e.g., wax) such that strain sensor 2718 easily separates from pressure pad 2714 once adhesive strain sensing pod 2700 is installed onto structural element 2750, but is sufficient to retain strain sensor 2718 with pressure pad 2714 and protective case 2702 prior to installation.

Energy Sources

The adhesive strain sensing pod may be powered by primary (i.e., disposable) and/or secondary (i.e., rechargeable) batteries. The adhesive strain sensing pod may also be powered by energy-harvesting technologies, such as one or more of wireless power transmission (including RFID), solar power, vibrations, compression, and thermal energy.

Data Collection and Adhesive Pod Configuration

Data collection and pod configuration are preferentially implemented wirelessly. Wireless communication may be implemented with one or more of: BLE, ANT/ANT+, Zigbee, Wifi, LoRa, LTE-M, or any other wireless communication protocol. Wireless mesh connectivity may be utilized to enable adhesive strain sensing pods to be spread out over moderate distances (e.g., several meters) and still be able to wirelessly pass data down a chain of adhesive pods to a single collecting pod or hub. In another example, data is passed down a chain of adhesive pods to multiple collecting pods and/or hubs. The hub may be a wireless device, such as a smartphone (to transmit many kilometers) or tablet, or it may be a wired computer or other data collection and transmission platform.

Data may be continuously collected, analyzed, and stored. Alternatively, data may be stored locally in memory of each adhesive pod, or in a data collection hub to be downloaded later. This data download may be configured to occur at predefined intervals, or it may occur when an authorized smartphone/tablet/portable computer passes near one of the adhesive pods or hub. Edge processing may also be used, where the pod performs calculations with the measured data and transmits a greatly reduced data set, thereby speeding up communications and reducing power consumption required for wireless communications.

In addition to the wireless methods discussed above, data collection and adhesive pod configuration may also be carried out using USB, power-over-ethernet (POE), or a similar wired connection port and protocol to the pods. Data collection and pod configuration via a wired connection may be useful in noisy radio frequency (RF) environments or when data rates are too high or the distances are too large for wireless protocols, or where electrical power needs to be provided to the pods. In addition, a mix of wireless and wired communication methods may be used.

When multiple adhesive pods are utilized on a structural element, time synchronization between the adhesive pods may be required for analysis purposes. Time synchronization between adhesive pods may occur before data collection begins or at various intervals during the data collection period.

Strain Sensor Diagnostics

Upon startup, various circuit tests may be performed with a built-in self-test (BIST) to check for open or short circuits, damaged strain sensors, and/or strain sensor bridges that are out of balance (i.e., the resistances of the legs are not sufficiently matched) and therefore do not provide enough head room (e.g., when one element of a bridge has a higher resistance than another, variation in the strain signal being captured by an ADC is reduced). A built-in resistor shunt test may be performed to confirm the integrity of the entire strain sensor measurement system (i.e., strain sensor, bridge, front-end electronics, ADC, etc.).

When a strain sensor is highly stressed or the adhesive breaks down, the strain sensor may delaminate from the surface of the structural element. When this occurs, self-heating of the strain sensor can arise because it no longer has good thermal contact with the underlying structural element (which normally acts as a heat sink). Self-heating due to delamination may be detected when the adhesive pod has no mechanical load as the strain sensor resistance, and hence apparent strain, will monotonically increase for a period of time until it reaches a steady state, since heat from the strain sensor is not conductively transferred to the structural element. Self-heating may manifest itself differently from system drift (e.g., caused by changes in humidity, etc.). Self-heating (e.g., temperature increase) of the strain sensor is caused by power flowing through the gage, but is reduced where the structural element that the strain sensor it attached to acts as a heat sink. Where the strain sensor is adhered to the structural element by a thin layer of adhesive, heat from self-heating flows through the adhesive and into the structural element, thereby reducing the effect of self-heating. However, where the strain sensor is adhered to the structural element by a thick layer of adhesive, or if the strain gage partially detaches from the structural element, heat cannot easily flow from the strain sensor into the structural element, and therefore, when power is applied to the strain sensor, self-heating is evident, and is reduced when power is turned off. To detect self-heating, the adhesive pod may be programmed to perform a BIST that controls the adhesive pod to repeatedly power cycle the strain sensor, i.e., apply power to the strain sensor, monitor the signal change, and remove the power from the strain sensor. The BIST may determine if the signal change corresponds to an expected temperature change due to the power cycling, and may thereby determine (a) whether the strain sensor is correctly adhered to the structural element, (b) whether the strain sensor is incorrectly adhered to the structural element, and (c) whether the strain sensor has detached form the structural element.

When a strain sensor is affixed to a structural element that is a poor thermal conductor, self-heating may occur if the strain sensor is continuously powered or sampled at high rates. A BIST may determine, via measurement, a maximum sampling rate that is sustainable before self-heating affects operation (e.g., degrades accuracy) of the adhesive pod. When the BIST determines that self-heating occurs at a constant rate, then self-heating may be compensated for as follows: (1) from a cold start, record zero-load baseline measurements over time; (2) during subsequent tests under similar conditions, but with loads applied, the corrected signal will be the difference between the recorded signal and the pre-recorded signal (assuming that the heat transfer has not changed between the set-up test time and the test sample load test time).

Pod Electronics

In certain embodiments, similar to adhesive strain sensing pods 1500 and 1600 of FIGS. 15 and 16, respectively, two separate structures are for example used for the strain sensors and the electronics (e.g., the electronics). These are typically connected by a flexible circuit (a flex), soldered wires, or a mechanical connection. These two separate structures may be combined into a more compact design by combining all pod electronics (e.g., processor, wireless transmitter, ADC, power electronics, analog circuitry, etc.) into a single "system-on-a-chip" or similar large-scale integration package. This compact electronics packaging may then be placed directly on a flex that connects to the strain sensor, or directly to the strain sensor backing material.

Strain Sensor Calibration

Strain sensor calibration may be performed using two approaches. In a first approach, the strain sensor may be affixed to a structural element that has been previously studied. The output of the strain sensor is then compared to the known strain of the structural element to obtain a calibration factor. Alternatively, the strain sensor may be placed on a simple, idealized object (e.g., a test coupon) with a known weight applied thereto. The output of the strain sensor may then be compared to a calculated experimental strain of the test coupon to obtain the calibration factor.

In a second approach, a shunt resistor is connected in parallel across one of the strain sensors of the bridge to produce a known change in resistance. The system output, due to this resistance change, can then be matched to the equivalent strain that would have been induced. The shunt resistor may be incorporated in the pod electronics and switched into and out of the bridge by the processor.

User Calibration

Where a user has installed any one or more of the adhesive strain sensing pods disclosed herein (e.g., any of pods 100, 200, 300, 400, 500, 600, 700, 800, 900, 1000, 1200, 1300, 1400, 1500, 1600, 1700, 1800, 1900, 2000, 2200, 2300, 2500, and 2700) on a surface of a structural element, the user may invoke a calibration function (e.g., a transfer function) of the pod while performing a calibration procedure. For example, where the pod includes each of bend, shear, and axial strain sensor bridges, after the pod is applied to the structural element, the user configures the pod in a test mode and applies three different forces of known magnitudes to the structural element. The pod may read values from each of the three bridges, and invoke the transfer function to determine calibration factors for the pod based upon the known magnitudes of the applied forces. The pod may then automatically, using the calibration factors, correct future values read from the three bridges.

Sensor Types

Although the above examples show pods with strain sensors, any of these pods may include one or more other sensors. That is, any of the adhesive strain sensing pods described herein (e.g., any of pods 100, 200, 300, 400, 500, 600, 700, 800, 900, 1000, 1200, 1300, 1400, 1500, 1600, 1700, 1800, 1900, 2000, 2200, 2300, 2500, and 2700) may include one or more strain sensors, single or multi-axis accelerometers, gyroscopes, magnetometers, temperature sensors, barometers, altimeters, humidity sensors, electromagnetic spectrum sensors for visible and/or invisible wavelengths, microphones (e.g., for acoustic and ultrasound measurements), electrical measurements (electrical current, electrical tomography), piezoelectric disc and inductive sensors for eddy current characterization.

One of more of these sensors may be mounted on a main PCB (e.g., with the electronics) in the pod and/or may be attached to the pod shell (e.g., protective case 1002) and/or independently attached to the prepared surface to which the pod is mounted. For example, where one or more sensors are attached to the prepared surface, they may be directly adhered to the surface and then wired to the PCB of the pod. Alternatively, the one or more sensors may be mounted at one end of a flex cable and that is adhered to the prepared surface and where the other end of the flex cable connects to the PCB.

Strain sensors may be mechanical, optical, and/or electrical transducers. They may be configured to measure a variety of different strains including, but not limited to, bending, torsion, shear, axial, hoop strains or any combination of these strains. When strain gauges are used as the strain sensors, they may be used in a quarter Wheatstone bridge, half Wheatstone bridge or full Wheatstone bridge. The strain sensors may be arranged/positioned based at least in part upon a type of loading being measured and a type of the structural element. Often the strain sensors are positioned to maximize signal output by spreading them far apart, for bending measurements, and/or arranged in a Poisson configuration (strain sensors oriented perpendicularly to each other) for maximum axial strain sensitivity. In some embodiments, a rosette configuration may be used. The rosette configuration is typically wired in a quarter bridge, but the sensitivity may be improved by placing a second set of strain sensors perpendicular to the first set and wiring the first and second sets of strain sensors up as a half bridge. Such arrangements are less sensitive to temperature change.

The strain sensors themselves may be constructed of metal foil, semiconductors, piezoelectric materials, and/or formed by various deposition methods. The sensors may be calibrated before installation or in other situations the sensors may be calibrated once the pod is installed. The strain sensors may be placed at various positions within the protective cover of the pod shell, but benefit from being close to the edge of the pod to be better able to measure strains in corners. Strain measurements and ensuing calculations could also be carried out to determine principal stresses.

In certain embodiments, where it is useful to have redundant strain sensors (or other sensors) in the pod, one or more additional strain sensors and/or sensors may be included in the pod. Then, when measurements are taken, the multiple sensors can be compared to one another. If the readings agree within some tolerance, then the average might be used as the correct value. On the other hand, if the values from the sensors do not agree to within a certain tolerance, then an error flag is raised and the sensor in error is taken out of the measurement loop until it is rectified.

Temperature Compensation

In certain embodiments, any of the adhesive strain sensing pods described herein (e.g., any of pods 100, 200, 300, 400, 500, 600, 700, 800, 900, 1000, 1200, 1300, 1400, 1500, 1600, 1700, 1800, 1900, 2000, 2200, 2300, 2500, and 2700) may implement temperature compensation for the pod electronics, strain sensors, and sensors. For example, during calibration, a known load (force, pressure, etc.) may be applied to the structural element at different temperatures at different temperatures the readings recorded and analyzed to determine temperature compensation. For example, interpolation may be used to estimate the values between measured temperatures to build a compensation chart (e.g., draw a compensation curve through the data points) or a table or to generate an adjustment formula. In another example, a user may indicate when a known situation occurs (e.g., a no-load situation), wherein the pod measures a current temperature (e.g., using a temperature sensor within the pod) and determines (or adjusts) the temperature compensation chart (e.g., compensation parameters) stored in the pod (or in a server in association with the pod).

Voltage in a Wheatstone bridge circuit used for strain sensor measurements typically varies with temperature change and thereby creates an unwanted change in a measured signal that is not related to the strain being measured. To compensate for the unwanted change in the measured signal due to temperature, the compensation chart/parameters/formula described above may be applied to adjust the output strain. The pod may then, at intervals, measure temperature and apply an appropriate adjustment to the measured value.

In certain scenarios, calibration may be performed by a user after the pod is installed on the structural element. In other scenarios, such calibration is not possible (e.g., when the pod is installed on a large structural element such as an outdoor road bridge). In these scenarios, when loading is known, the user may instruct the pod to measure temperature and determine a compensation for that temperature. The accuracy of the temperature compensation increases as the number of collected data points increases.

Circuitry

Figure 29:
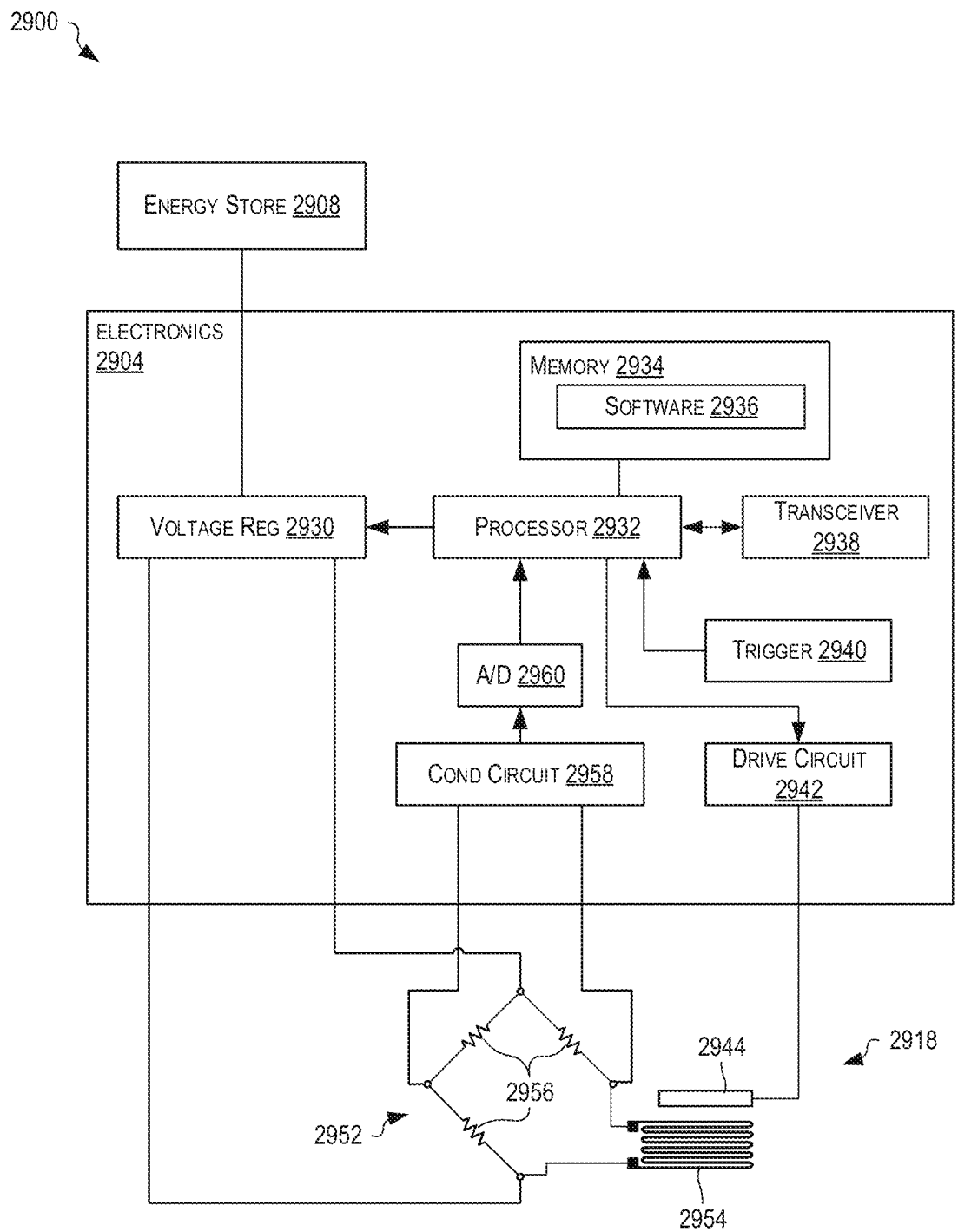
FIG. 29 shows one example circuit that may be implemented, at least in part, in any of the pods described herein, in an embodiment.

FIG. 29 shows one example circuit 2900 that may be implemented, at least in part, in any of the pods described herein (e.g., any of pods 100, 200, 300, 400, 500, 600, 700, 800, 900, 1000, 1200, 1300, 1400, 1500, 1600, 1700, 1800, 1900, 2000, 2200, 2300, 2500, and 2700). In circuit 2900, power is received by electronics 2904 from an energy store 2908 (e.g., a battery). Electronics 2904 may include a voltage regulator 2930, a processor 2932, a memory 2934, a transceiver 2938, a trigger circuit 2940, a drive circuit 2942, a signal conditioning circuit 2958, and an analog to digital (A/D) converter 2960. Circuit 2900 also includes a Wheatstone bridge 2952 that may be formed of a plurality of resistors 2956 and at least one strain sensor component 2954, which may collectively be referred to as a strain sensor 2918.

Voltage regulator 2930 converts electrical power from energy store 2908 to power one or more of processor 2932, memory 2934, transceiver 2938, trigger circuit 2940, drive circuit 2942, Wheatstone bridge 2952, signal conditioning circuit 2958, and A/D converter 2960. For clarity of illustration, power connections (e.g., ground and V+) are not shown in FIG. 29.

Memory 2934 is shown storing software 2936 that may include machine-readable instructions that are executable by processor 2932 to provide pod functionality as described herein. For example, software 2936 may implement one or more algorithms describe herein. Software 2936 and processor 2932 may control transceiver 2938 to allow the pod to communicate with other devices (e.g., pods, mobile devices, etc.). As described above, software 2936 and processor 2932 may receive a trigger event (e.g., corresponding to removal of the protective file, or application of force to the protective case of the pod, or an external signal indicative of installation) from trigger circuit 2940 and/or transceiver 2938, and activate drive circuit 2942 for a required period. Drive circuit 2942 may provide power to an electric heating element 2944 positioned proximate strain sensor component 2954, to generate heat that initiates a thermal adhesive. In certain embodiments, electric heating element 2944 and strain sensor component 2954 are one and the same, wherein drive circuit 2942 drives strain sensor component 2954 to generate heat. In certain embodiments, drive circuit 2942 and/or electric heating element 2944 are external to the pod and are therefore omitted from circuit 2900.

In certain embodiments, voltage regulator 2930 may further stabilize power from energy store 2908 into a stabilized voltage source for operating Wheatstone bridge 2952. Outputs from Wheatstone bridge 2952 are input to signal conditioning circuit 2958 and a conditioned signal representative of a force applied to strain sensor component 2954 is input to A/D converter 2960. A/D converter 2960 converts the conditioned signal into a digital signal that is input to processor 2932 and may be digitally processed by one or more algorithms of software 2936.

In the various pod embodiments described herein, one or more components of circuit 2900 may be omitted when not needed.

Surface Preparation

Depending on the geometry, roughness, age, weathering, integrity and cleanliness of the structural element to which the adhesive strain sensing pod to be attached, work may be needed to prepare the surface for attachment of the adhesive strain sensing pod. This work may entail one or more of scraping, filing, sanding, sand blasting, laser etching and/or other methods to make the prepared surface smooth and/or even penetrate the surface down to the base substrate material of the structural element. Conventional tools could be used to create prepared surface, and/or small, purpose built, portable tools may be employed. For example, a sand blaster may use a small $CO_2$ cartridge to propel the sand for cleaning the surface of the structural element. In another example, a small battery powered mechanical sander may be used to create the prepared surface. Once the surface has been mechanically prepared (if required), additional chemical cleaning may be used to remove any grease, oil, dirt, moisture, or other unwanted chemicals from the prepared surface.

Strain Sensor Placement in Pod

External geometry and/or alignment marks of a protective case, as described above and shown in FIGS. 5A, 5B, and 5C, may be used with any adhesive strain sensing pod described herein (e.g., any of pods 100, 200, 300, 400, 500, 600, 700, 800, 900, 1000, 1200, 1300, 1400, 1500, 1600, 1700, 1800, 1900, 2000, 2200, 2300, 2500, and 2700) to facilitate placement of the pod on a prepared surface such that an internal strain sensor is correctly aligned to that surface. Accordingly, the internal strain sensor must be correctly aligned to the protective case (e.g., outer housing) of the adhesive strain sensing pod, and/or the applied markings. To ensure correct alignment, a pressure pad may be securely retained (e.g., adhered, slots, membranes, tape, etc.) within the protective case and the strain sensor may attach to the pressure pad (or to protective case when the pressure pad is omitted) such that the strain sensor is retained within protective case prior to installation. For example, a light strength glue or double-sided tape may adhere an upper surface of the strain sensor to a lower surface of the pressure pad. Accordingly, the coupling between the strain sensor and the pressure pad is weaker than the coupling between the pressure pad and the protective case. Advantageously, orientation of strain sensor with respect to protective case is maintained prior to installation of adhesive strain sensing pod.

The protective case may be manufactured (e.g., injection molded) to include one or more of guides, alignment pins, marks, and the like, that may be used to ensure that the strain sensors are aligned with the external pod geometry. In that manner, by aligning the external geometry and/or markings, the strain sensors may be aligned with key features (e.g., geometry) of the instrumented object (e.g., the structural element).

In certain embodiments, an adhesive strain sensing pod may have a custom shape for coupling with a surface that is not flat. For example, the pressure pad may be shaped to apply a required custom pressure to the strain sensor such that the strain sensor conforms to the surface that is not flat. This ensures a thin adhesive-line results when the pod is applied. Further, to ensure a watertight fit, a housing adhesive may also be shaped for the custom surface. Similarly, for more extreme shapes, the protective case may be molded to conform to the custom shape.

Within the adhesive strain sensing pod, the strain sensor may attach to the pressure pad. Alternatively, the strain sensor may attach to a foam substrate that holds the strain sensor in place for assembly. In certain embodiments, the strain sensor may be suspended on a polyimide sheet and the polyimide sheet is attached to the outer housing, such that the strain sensor is held in place like a trampoline. In another embodiment, the strain sensor may be suspended with tape, wire or other such filament to the outer housing. This ensures that the strain sensor is correctly positioned within the outer housing and correct alignment of the strain sensor to the structural element is easily achieved during installation.

Pod Location

Where a pod is positioned at a certain geographic location, a variety of methods may be used to record the location of the pod. For example, a camera may be used to take a picture that includes both the pod and a landmark, on the structural element or surrounding environment, defining the location of the pod. The picture may also have metadata defining GPS coordinates and orientation of the camera. In certain embodiments, the pod may include a GPS receiver that is used to determine a location of the pod. The pod may be associated (e.g., tapped and/or paired) with a mobile communication device (e.g., one of a smartphone, a tablet, a laptop, etc.) and the mobile communication device may use its own GPS receiver (or other location determining device) to determine the pod's location when near the pod (e.g., when in communication with the pod). Augmented reality may be used to both plan and define a location of the pod. In addition to this, wireless angle of arrival (AoA) calculations may be used to position multiple pods relative to each other.

Wakeup

In embodiments where the pod operates wirelessly, the pod may automatically revert to a sleep mode to conserve battery power when not being used. Where the pod is in the sleep mode, the pod is configured with a method to wake it up and transition from the sleep mode to an active state for configuration and/or data acquisition.

The pod may implement one or more of several methods to allow it to transition (e.g., to wake up) from the sleep mode to the active state. Since the pod has wireless communications (e.g. BT, BLE, ANT+, etc.), it may periodically scan for signals from a controlling device (e.g., a hub, a mobile communication device, and/or another pod) that wishes to communicate with the pod. The pod may be equipped with an Inertial Measurement Unit (IMU), accelerometer, or other motion detection sensor. Accordingly, the pod may be configured to transition from the sleep mode to the active mode when it detects motion (e.g., a tap, shake, rotation, or some other motion). Alternatively, the pod may be configured to wake up by a radio frequency identification signal (RFID) or near field communication (NFC) signal. In other embodiments, the pod may be configured to wake up when a certain acoustical and/or optical signal is detected. In certain embodiments, the pod may include a push button that may be depressed to wake up the pod.

Connectivity

Any of the pods described herein (e.g., any of pods 100, 200, 300, 400, 500, 600, 700, 800, 900, 1000, 1200, 1300, 1400, 1500, 1600, 1700, 1800, 1900, 2000, 2200, 2300, 2500, and 2700) may include one or both of wired and/or wireless communication capabilities. Communication may be used for debugging, firmware reprogramming, configuration, and/or data exchange. The wired connection may be implemented as one or more of USB, CanBus, and/or a custom connection/protocol. These wired connections may also enable powering/recharging of the pod, streaming data monitoring, and connection to a mass storage device such as an SD card and/or USB storage. Wireless communication may include, but is not limited to, BT, BLE, ANT+, ZigBee, Wi-Fi, and/or telecom standards (e.g., 2G, 3G, 4G (LTE), and 5G). The pod may implement a wireless mesh protocol that enables the pod to participate in a mech network, thereby enabling long distance communication between pods and/or between the pod and a hub. Time synchronization may be implemented between pods when required.

User Interfaces & Data Visualization

In certain embodiments, the pod has no tactile or visible user interface, and configuration and interaction occurs via a wired or wireless connection. In these embodiments, the pod may communicate with dedicated hardware (e.g., a separate user interface device), a mobile communication device (e.g., a smartphone, a tablet, a laptop computer) and/or a personal computer. In certain embodiments, the pod may include hardware/software that implements an interface using one or more of tactile, acoustical, and/or optical interactions. This hardware may include buttons, switches, LED lights (or similar), alphanumeric or bitmapped display (with or without touch screen interactivity).

Onboard Pod Algorithms—Edge Computing

The pod firmware may be configured with one or more algorithms and software routines. In one example, it may measure and store and/or stream raw data from one of more of its onboard sensors. In another example, the pod may include one or more algorithms that perform onboard calculations, such as, but are not limited to, signal averaging, standard deviation, signal ranging, sensor fusion, Fourier transforms, structure fatigue life damage calculations, and curve-fitting raw data to a prescribed model. These algorithms may be configured to perform over a configurable period, for example. In certain embodiments, the pod may operate in an edge processing configuration and includes one or more algorithms to implement one or more of sensor fusion, Fourier transforms, structural fatigue life damage calculations, and curve-fitting the raw data to some prescribed model. For example, when the pod uses strain sensors, an algorithm may automatically detect a maximum sampling rate that the strain sensors can endure before material self-heating becomes a concern. That is, the algorithms may determine how many minutes the pod can operate at a given sampling rate, for a given number of sensors being monitored, at various operating temperatures, and with different algorithms running for a given available battery life.

When utilizing one or more strain sensors in the pod, the default output from the sensors will be strain (or commonly known as strain counts when digitized). For many purposes, that may be all that's required. In other situations, it will be desired to convert those strains to stresses, force, pressure, torque, etc. For that to take place, it will have been necessary to calibrate the structure with a known load thus providing a scale factor so the strains are converted to physical units. If individual strain pod calibration is not possible, one may be able to utilize averaged calibration factors from similar structures that have been previously calibrated. Note that the calibration may involve something more sophisticated that a simple scale factor. A general function could be applied that combines two or more strains and input from other sensors on the pod (or from other pods).

Applications

When several adhesive strain sensing pods are applied to a structural element, the results may be combined to produce a strain distribution or contour map of the structural element at different times to analyze the behavior of the structural element. With one or more additional onboard sensors, the pod (or a plurality of pods) may have many different applications, including, but not limited to:

(a) Machinery and structural vibration monitoring, such as one or more of: engine cylinder misfiring and tuning, bearing analysis, civil structures, strain measurement on landing gear, strain measurement on transportation vehicles—land, air & water, and any other application of strain, stress, force, pressure, and torsion measurement.

(b) Environmental monitoring, such as one or more of: drop them from the air, a distributed sensor network, measure vibration, air quality, humidity, strain, and avalanche tremor, oceans, fires.

(c) Building monitoring, such as one or more of: temperature and humidity monitoring, noise level monitoring, and security—movement monitoring.

(d) Structure monitoring, such as one or more of: numerical modeling verification tool, plane stress monitoring, and, when a sufficient number of pods outfit a structural surface, visualizing the vibration and strain patterns.

(e) Sport equipment, such as one or more of: monitoring and analysis of forces in the equipment, and force, torque, and power measurement of athlete performance.

(f) Part monitoring, such as one or more of: RFID—tag any structure, sub-structure or part, and ID/location/position/damage/environment of parts during transport and/or storage.

(g) Civil structures, including one or more of: bridges, buildings and windows, towers, power poles, windmill supports, tunnels, and dams.

(h) Prototypes and product development samples: field testing, lab testing, and forensic testing.

(i) Industrial structures, such as one or more of: machinery condition monitoring of vibration and/or strain, torque measurement in shafts, piping and pressure vessels, cranes, industrial machines (e.g., forklifts, graders, front-end loaders, etc.), and pumpjacks.

(j) Consumer products, such as one or more of: sport devices (e.g., power meters for bicycles and skis) and recreational vehicles.

(k) Transportation, such as one or more of: terrestrial transportation, aquatic transportation and aerospace transportation; airplanes, trains, buses, automobiles, boats, ships, cars.

Embodiments described herein are also well-suited for configuration and operation as an Internet-of-Things (IoT) device due to compactness, ease of connection, variety of types and configurations of sensors, and a variety of connectivity methods.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An adhesive strain sensing pod, comprising:
an energy store including a battery;
at least one strain-gauge;
a printed circuit board assembly (PCBA) electrically coupled to the energy store and the at least one strain-gauge, the PCBA having electronics configured to electrically sense at least one strain signal from the at least one strain-gauge;
a protective case for protecting the at least one strain-gauge and the PCBA;
a sensor adhesive including a thermally activated adhesive film for adhering a lower surface of the strain-gauge to a surface of a structural element;
a pressure pad positioned at a lower region of the protective case, the pressure pad conveying a force, applied to the protective case during installation of the adhesive strain sensing pod, to evenly press the at least one strain-gauge against the surface of the structural element;
a housing adhesive, applied to a lower edge of the protective case, for adhering the protective case to the surface of the structural element; and
a protective film sized to cover, and applied to, a lower area of the protective case to protect the sensor adhesive and the housing adhesive;
wherein the at least one strain-gauge is retained within, and aligned with, the protective case to expose the sensor adhesive for coupling with the surface of the structural element when the protective film is removed.

2. An adhesive strain sensing pod, comprising:
an energy store;
at least one strain sensor;
electronics electrically coupled to the energy store and the at least one strain sensor and configured to electrically sense at least one strain signal from the at least one strain sensor; and
a-sensor adhesive for adhering a lower surface of the strain sensor to a surface of a structural element;
wherein the electronics includes a processor, a memory storing machine-readable instructions implementing at least one algorithm, and a wireless transceiver.

3. The adhesive strain sensing pod of claim 2, further comprising a protective case that protects the at least one strain sensor and the electronics.

4. The adhesive strain sensing pod of claim 3, further comprising a protective film sized to cover, and applied to, a lower area of the protective case to protect the sensor adhesive, wherein the at least one strain sensor is retained within the protective case to expose the sensor adhesive for coupling with the surface of the structural element when the protective film is removed.

5. The adhesive strain sensing pod of claim 4, further comprising housing adhesive, applied to a lower edge of the protective case, for adhering the protective case to the surface of the structural element, wherein a lower surface of the housing adhesive is covered by the protective film.

6. The adhesive strain sensing pod of claim 5, the housing adhesive comprising a double-sided tape shaped and sized to cover at least part of the lower edge of the protective case.

7. The adhesive strain sensing pod of claim 3, further comprising a pressure pad positioned at a lower region of the protective case, the pressure pad conveying a force, applied to the protective case during installation of the adhesive strain sensing pod, to press the at least one strain sensor against the surface of the structural element.

8. The adhesive strain sensing pod of claim 7, wherein the pressure pad is retained with the protective case by one or more of an adhesive, a membrane, a double-sided tape, and structure of the protective case.

9. The adhesive strain sensing pod of claim 8, wherein the at least one strain sensor is attached to the pressure pad and retained with the protective case.

10. The adhesive strain sensing pod of claim 9, wherein orientation and position of the at least one strain sensor is maintained with respect to the protective case.

11. The adhesive strain sensing pod of claim 10, the protective case further comprising a visual indicator defining orientation of the at least one strain sensor with the adhesive strain sensing pod.

12. The adhesive strain sensing pod of claim 9, the at least one strain sensor separating from the pressure pad when the force is removed.

13. The adhesive strain sensing pod of claim 7, further comprising a fragile pouch that contains the sensor adhesive prior to installation of the adhesive strain sensing pod on the surface of the structural element, the fragile pouch being proximate the pressure pad, wherein the pressure pad ruptures the fragile pouch and forces the sensor adhesive around the at least one strain sensor when the adhesive strain sensing pod is pressed onto the structural element.

14. The adhesive strain sensing pod of claim 13, the pressure pad having at least one perforation to allow the sensor adhesive to permeate the pressure pad and flow beneath the at least one strain sensor.

15. The adhesive strain sensing pod of claim 13, the fragile pouch being positioned adjacent to the at least one strain sensor and configured to eject the sensor adhesive beneath the at least one strain sensor when the adhesive strain sensing pod is pressed onto the structural element.

16. The adhesive strain sensing pod of claim 13, the fragile pouch comprising a plurality of fragile pouches, each containing one of two parts of the sensor adhesive that mix when the adhesive strain sensing pod is pressed onto the structural element.

17. The adhesive strain sensing pod of claim 3, the protective case being shaped for positioning adjacent to a second adhesive strain sensing pod, wherein the adhesive strain sensing pod and the second adhesive strain sensing pod cooperate to sense strain patterns and derived stresses, forces, and torques of the structural element.

18. The adhesive strain sensing pod of claim 2, the strain sensor comprising one or more of a strain gauge, a laser-based strain sensor, a piezoelectric-based strain sensor, a photoelectric-based strain sensor, a vibrating wire, and a fiber optic.

19. The adhesive strain sensing pod of claim 2, the sensor adhesive being an ultra-violet (UV) curable adhesive, the adhesive strain sensing pod further comprising a UV source, wherein the electronics activates the UV source to cure the sensor adhesive during installation of the adhesive strain sensing pod.

20. The adhesive strain sensing pod of claim 2, the sensor adhesive being a thermally activated adhesive film applied to a lower surface of the at least one strain sensor.

21. The adhesive strain sensing pod of claim 20, the thermally activated adhesive film comprising one of a thermoplastic adhesive and a thermosetting adhesive.

22. The adhesive strain sensing pod of claim 20, the thermally activated adhesive film comprising one of a polyamide, polycarbonate, polyethylene vinyl acetate, polyethylene, polypropylene, polyester, epoxy resin, polyurethane adhesive, polyurea adhesive, nitrile-butadiene rubber, polyacrylate, phenolic resin, and silicone.

23. The adhesive strain sensing pod of claim 20, the thermally activated adhesive film being activated by a heating element placed on, or in a vicinity of, the surface of the structural element, the heating element being an electrically conductive structure capable of converting electrical energy into thermal energy.

24. The adhesive strain sensing pod of claim 23, the heating element being positioned on a first side of the strain sensor, the thermally activated adhesive film being positioned on the opposite side of the strain sensor.

25. The adhesive strain sensing pod of claim 23, the electronics further comprising a drive circuit for driving a current through the heating element to generate heat for initiating the thermally activated adhesive film.

26. The adhesive strain sensing pod of claim 25, further comprising a trigger mechanism for operating the drive circuit for a predefined heating period corresponding to the thermally activated adhesive film.

27. The adhesive strain sensing pod of claim 20, the thermally activated adhesive film being activated by inductive heating.

28. The adhesive strain sensing pod of claim 2, further comprising an energy harvester for charging the energy store, the energy harvester being selected from the group comprising: solar collector, inductive collector, thermal collector, mechanical motion conversion, and radio frequency collector.

29. The adhesive strain sensing pod of claim 2, the at least one algorithm comprising one or more of signal averaging, standard deviation, signal ranging, sensor fusion, Fourier transforms, structure fatigue life damage calculations, and curve-fitting raw data to a prescribed model.

30. The adhesive strain sensing pod of claim 2, the at least one algorithm automatically detecting a maximum sampling rate that the strain sensor can sustain before self-heating of the at least one strain sensor degrades accuracy of the adhesive strain sensing pod.

31. The adhesive strain sensing pod of claim 2, further comprising one or more of a temperature sensor, a pressure sensor, an accelerometer, a gyroscope, and a magnetometer.

32. A method for adhering a strain sensor to a surface of a structural element, comprising:

rupturing, in response to a force applied to press a protective case of an adhesive strain sensing pod containing the strain sensor against the surface, a fragile pouch containing a sensor adhesive, to spread the sensor adhesive between the strain sensor and the surface; and transferring at least part of the force to press the strain sensor towards the surface;

wherein said transferring results in a thin layer of the sensor adhesive between the strain sensor and the surface.

33. The method of claim 32, further comprising ejecting the sensor adhesive beneath the strain sensor when the fragile pouch is ruptured.

34. The method of claim 32, further comprising operating an ultraviolet (UV) light source to cure the sensor adhesive when the sensor adhesive is a UV cured adhesive.

35. A method for adhering a strain sensor to a surface of a structural element, comprising:

applying a force against a protective case of an adhesive strain sensing pod containing the strain sensor, wherein said applying includes transferring at least part of the force through the protective case to press the strain sensor against the surface; and operating an electrical element to activate a thermally activated adhesive film positioned between the strain sensor and the surface;

wherein said applying results in a thin layer of the adhesive forming a bond between the strain sensor and the surface when the thermally activated adhesive film is cured.

* * * * *